US010896292B1

(12) United States Patent
Norton

(10) Patent No.: US 10,896,292 B1
(45) Date of Patent: Jan. 19, 2021

(54) OCR ERROR CORRECTION

(71) Applicant: FIRST AMERICAN FINANCIAL CORPORATION, Santa Ana, CA (US)

(72) Inventor: Jeffrey Norton, Laguna Niguel, CA (US)

(73) Assignee: FIRST AMERICAN FINANCIAL CORPORATION, Santa Ana, CA (US)

(*) Notice: Subject to any disclaimer, the term of this patent is extended or adjusted under 35 U.S.C. 154(b) by 0 days.

(21) Appl. No.: 16/932,004

(22) Filed: Jul. 17, 2020

(51) Int. Cl.
*G06F 40/284* (2020.01)
*G06K 9/46* (2006.01)
*G06F 16/245* (2019.01)

(52) U.S. Cl.
CPC .......... *G06F 40/284* (2020.01); *G06F 16/245* (2019.01); *G06K 9/46* (2013.01); *G06K 2209/01* (2013.01)

(58) Field of Classification Search
CPC .......... G06K 9/344; G06F 40/30; G06F 40/10
See application file for complete search history.

(56) References Cited

PUBLICATIONS

Eutamene, Aicha, Mohamed Khireddine Kholladi, and Hacene Belhadef. "Ontologies and Bigram-based Approach for Isolated Non-word Errors Correction in OCR System." International Journal of Electrical & Computer Engineering (2088-8708) 5.6 (2015).*
Tong, Xiang, and David A. Evans. "A statistical approach to automatic OCR error correction in context." Fourth Workshop on Very Large Corpora. 1996.*
Barnes et al., "Correcting Keyboard Layout Errors and Homoglyphs in Queries," Proceedings of the 2014 Conference on Empirical Methods in Natural Language Processing (EMNLP), 2014, 6 pages.
Bassil et al., "OCR Context-Sensitive Error Correction Based on Google Web 1T 5-Gram Data Set," American Journal of Scientific Research, Feb. 2012, Issue. 50, ISSN 1450-223X, 13 pages.
Bornstein, Aaron, "Homoglyph attack prevention with OCR.," Homoglyph attack prevention with OCR.—Towards Data Science, https://towardsdatascience.com/homoglyph-attack-prevention-with-ocr-a6741ee7c9cd, Apr. 28, 2019, Retrieved on Apr. 2, 2020, 7 pages.
Chen et al., "Efficient Automatic OCR Word Validation Using Word Partial Format Derivation and Language Model," Document Recognition and Retrieval XVII (2010). vol. 7534. International Society for Optics and Photonics, 8 pages.
D'Hondt et al., "Generating a Training Corpus for OCR Post-Correction Using Encoder-Decoder Model," Proceedings of the Eighth International Joint Conference on Natural Language Processing (2017) (vol. 1: Long Papers), 9 pages.
Marosi, Istvan, "Inside OCR: A look behind the scenes," Nuance Document Imaging Developers Conference 2016, 27 pages.

(Continued)

*Primary Examiner* — Matthew H Baker
(74) *Attorney, Agent, or Firm* — Sheppard, Mullin, Richter & Hampton LLP

(57) ABSTRACT

Implementations of the disclosure are directed to OCR error correction systems and methods. In some implementations, a method comprises: obtaining, at a computing device, optical character recognition (OCR) text extracted from a document image, the text comprising a token; searching, at the computing device, based on a token bigram determined from the token and a mapping between words in a corpus and a corpus bigram set comprised of unique bigrams from the beginning or ending of the words in the corpus, the corpus for a best word to replace the token; and replacing, at the computing device, the token with the best word.

17 Claims, 16 Drawing Sheets

(56) References Cited

PUBLICATIONS

Whitelaw et al., "Using the Web for Language Independent Spellchecking and Autocorrection," Proceedings of the 2009 Conference on Empirical Methods in Natural Language Processing, 2009, 11 pages.

* cited by examiner

| Legal Descriptions | | Vesting Phrases | |
|---|---|---|---|
| Word | Probability % | Word | Probability % |
| county | 1.12 | wife | 1.72 |
| feet | 1.05 | husband | 1.70 |
| said | 0.82 | tenants | 1.26 |
| lot | 0.75 | joint | 0.95 |
| thence | 0.65 | trust | 0.74 |
| recorded | 0.65 | property | 0.72 |
| line | 0.49 | man | 0.69 |
| parcel | 0.47 | limited | 0.62 |
| north | 0.46 | llc | 0.61 |
| east | 0.45 | company | 0.56 |

FIG. 4

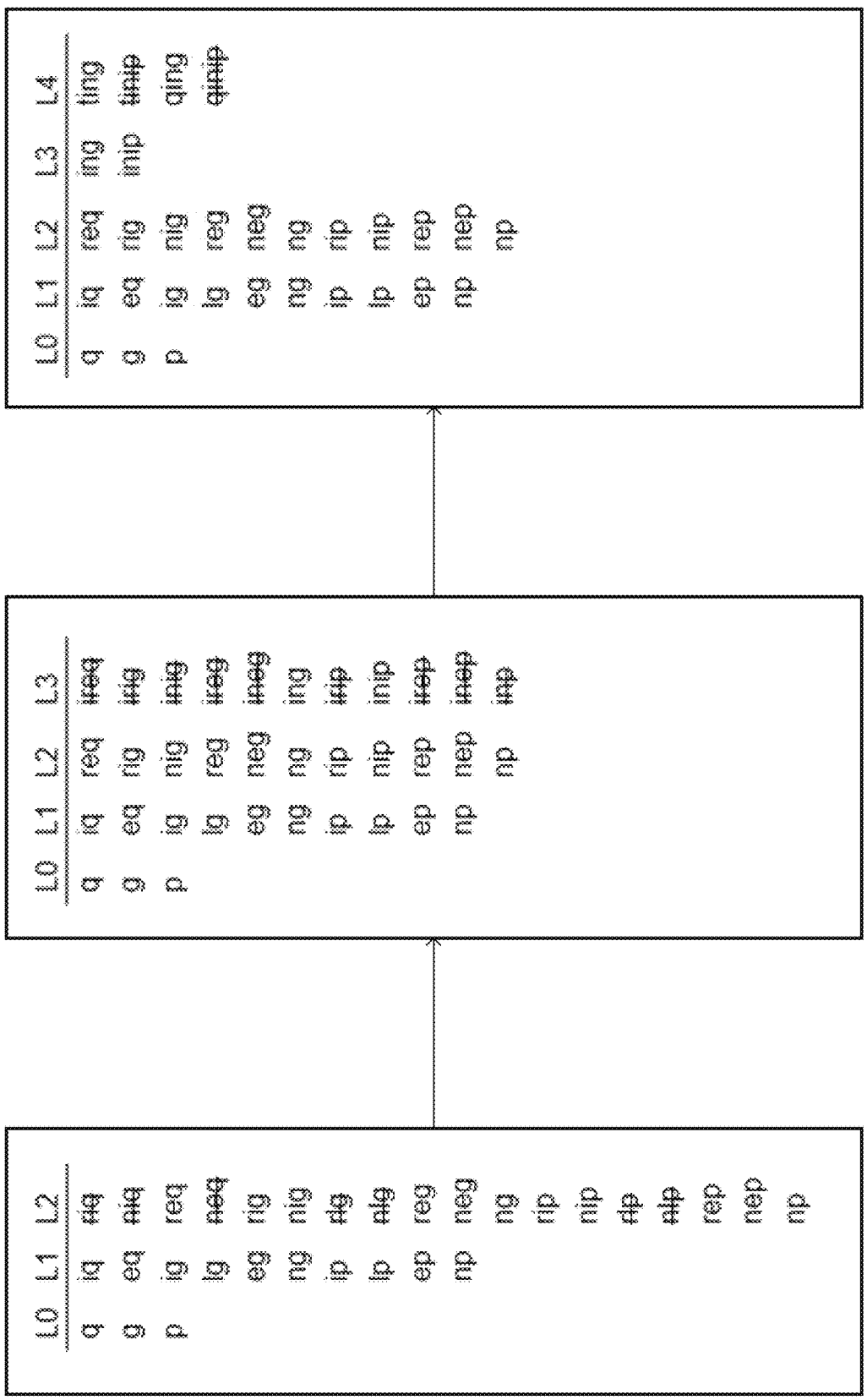

| L0 | L1 | L2 | L3 | L4 | L5 |
|---|---|---|---|---|---|
| q | iq | req | ing | ting | sting |
| g | eq | rig | inip | qing | sqing |
| p | ig | nig | | | |
| | lg | reg | | | |
| | eg | neg | | | |
| | ng | ng | | | |
| | ip | np | | | |
| | lp | np | | | |
| | ep | rep | | | |
| | np | nep | | | |
| | | np | | | |

FIG. 13G

| L0 | L1 | L2 | L3 | L4 | L5 | L6 |
|---|---|---|---|---|---|---|
| q | iq | req | ing | ting | sting | esting |
| g | eq | rig | inip | qing | | |
| p | ig | nig | | | | |
| | lg | reg | | | | |
| | eg | neg | | | | |
| | ng | ng | | | | |
| | ip | np | | | | |
| | lp | np | | | | |
| | ep | rep | | | | |
| | np | nep | | | | |
| | | np | | | | |

FIG. 13H

|     | L0 | L1 | L2  | L3   | L4   | L5    | L6    | L7      |
| --- | -- | -- | --- | ---- | ---- | ----- | ----- | ------- |
|     | q  | iq | req | ing  | ting | sting | esting | yesting |
|     | g  | eq | rig | inip | qing |       |       | jesting |
|     | p  | ig | nig |      |      |       |       | pesting |
|     |    | ig | reg |      |      |       |       | vesting |
|     |    | eg | neg |      |      |       |       | uesting |
|     |    | ng | ng  |      |      |       |       | xesting |
|     |    | ip | rip |      |      |       |       |         |
|     |    | ip | nip |      |      |       |       |         |
|     |    | ep | rep |      |      |       |       |         |
|     |    | np | nep |      |      |       |       |         |
|     |    |    | np  |      |      |       |       |         |

FIG. 13I

OCR ERROR CORRECTION

BACKGROUND

For many years, computers have had the ability to convert and store physical documents into digital documents. Generally, the conversion involves using an imaging device (e.g., document scanner attached to a computer) to scan the physical document and convert the resulting digital representation to a computer image file, such as, for example, a bitmap image (BMP) file, a Tagged Image File Format (TIFF) file, or a Joint Photographic Experts Group (JPEG) file. Following the scan, the image file of the document may be post-processed using optical character recognition (OCR) software, which locates characters within the image of the document (whether they are handwritten, typewritten, or printed) and translates them to computer-readable text.

With the world becoming increasingly digital, converting physical records to digital form accessible by computers has become commonplace. This is especially true in industries such as healthcare and real estate, where heavy reliance is placed on document scanners and OCR software to accurately convert the physical records into digital records. For example, in the real estate industry, both business and government entities are currently involved in converting physical real estate documents stored at public records offices to digital documents.

Despite significant advances in OCR, it remains incapable of converting poor quality physical documents at 100% correctness. When the documents form the basis of risk assessment and/or insurance (e.g., in connection with real property title), correctness and accuracy are of paramount importance. For example, the source documents for property title may comprise a combination of typed text, handwritten notation, stamped markings, and other varying and unique information. In addition, it is not uncommon for title documents to be decades old (resulting in poor quality, low resolution scans, potentially scaled at different horizontal and vertical ratios, etc.), resulting in documents that are "dirty" and difficult to OCR. Thus, the challenges of obtaining a correct and accurate OCR of documents, coupled with the potential risk exposure attendant with that increase the importance of accurate and correct OCR tools and methods.

SUMMARY

Implementations of the disclosure are directed to OCR error correction systems and methods.

In one embodiment, a non-transitory computer-readable storage medium stores instructions that, when executed by a processor, cause a system to perform operations comprising: obtaining optical character recognition (OCR) text extracted from a document image, the OCR text comprising a token; searching, based on a token bigram determined from the token and a mapping between words in a corpus and a corpus bigram set comprised of unique bigrams from the beginning or ending of the words in the corpus, the corpus for a best word to replace the token; and replacing the token with the best word.

In some implementations, searching the corpus for the best word comprises searching only the words in the corpus beginning or ending with a bigram that is the same as the token bigram. In some implementations, searching the corpus for the best word further comprises: creating, based on the token bigram and the mapping, a list comprising a plurality of possible words, the possible words including the best word; determining a probability of occurrence of each of the plurality of possible words in the corpus; and selecting as the best word the one of the plurality of possible words having the highest probability of occurrence in the corpus.

In some implementations, searching the corpus for the best word further comprises: determining a first set of one or more homoglyphs from a first token part of the token or a last token part of the token; creating a first list of one or more homoglyphs from the first set; determining a second set of one or more homoglyphs from a second token part of the token or a penultimate token part of the token; and appending or prepending each of the homoglyphs of the second set to at least one of the homoglyphs of the first list to create an updated first list.

In some implementations, determining the first set of homoglyphs, comprises: determining one or more first homoglyphs of the first token part or the last token part; and applying an allowable character filter to the first homoglyphs and the first token part or the last token part; and determining the second set of homoglyphs, comprises: determining one or more second homoglyphs of the second token part or the penultimate token part; and applying the allowable character filter to the second homoglyphs and the second token part or the penultimate token part. The allowable character filter may be configured to filter out predetermined characters. The predetermined characters may comprise diacritics, numerical characters, and/or capitalized characters.

In some implementations, searching the corpus for the best word further comprises removing, using the mapping, any of the entries of the updated first list beginning or ending with a bigram character sequence not present in the words of the corpus. In some implementations, the token comprises more than two token parts, and searching the corpus for the best word further comprises: determining a third set of one or more homoglyphs for a third token part of the token or an antepenultimate token part of the token; appending or prepending each of the homoglyphs of the third set to at least one of the entries of the updated first list to create a further updated first list of entries; and removing, using the mapping, any entries of the further updated first list beginning or ending with a character sequence not present in the words of the corpus.

In some implementations, determining the third set of homoglyphs, comprises determining one or more third homoglyphs of the third token part or the antepenultimate token part; and applying an allowable character filter to the third homoglyphs and the third token part or the antepenultimate token part, wherein the allowable character filter is configured to filter out predetermined characters.

In some implementations, searching the corpus for the best word further comprises determining the token bigram by: determining one or more homoglyph pairs of each of a first token part and a second token part of the token, or each of a last token part and a penultimate token part of the token; and determining the token bigram as one of the one or more homoglyph pairs.

In one embodiment, a method comprises: obtaining, at a computing device, optical character recognition (OCR) text extracted from a document image, the text comprising a token; searching, at the computing device, based on a token bigram determined from the token and a mapping between words in a corpus and a corpus bigram set comprised of unique bigrams from the beginning or ending of the words in the corpus, the corpus for a best word to replace the token; and replacing, at the computing device, the token with the best word.

In one embodiment, a non-transitory computer-readable storage medium stores instructions that, when executed by a processor, cause a system to perform operations comprising: obtaining text from a document associated with an application, the text comprising a token; applying at least one filter to the token to obtain a plurality of possible words for the token, the at least one filter comprising a bigram to corpus mapping filter, an allowable character filter, or a bigram filter; applying a probability filter to identify a word in the corpus as a most probable word of the possible words for the token; and replacing the token with the most probable word.

In some implementations, applying the at least one filter comprises applying the bigram to corpus mapping filter to determine if a bigram obtained from the token is the same as a bigram in at least one word of the corpus.

In some implementations, the bigram obtained from the token comprises a bigram obtained from the end or the beginning of the token, and the bigram in the corpus is at the end or the beginning of the at least one word in the corpus.

In some implementations, applying the at least one filter to the token, comprises iteratively applying the at least one filter to the token to obtain the plurality of possible words.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more implementations, is described in detail with reference to the following figures. The figures are provided for purposes of illustration only and merely depict example implementations.

FIG. 4 shows the top ten most common words and their associated probabilities for two corpora created from legal descriptions and vesting phases, respectively, following the techniques described herein.

FIG. 13D depicts a list generated by performing homoglyph replacement in accordance with implementations of the disclosure.

FIG. 13E depicts a list generated by performing homoglyph replacement in accordance with implementations of the disclosure.

FIG. 13F depicts a list generated by performing homoglyph replacement in accordance with implementations of the disclosure.

FIG. 13G depicts a list generated by performing homoglyph replacement in accordance with implementations of the disclosure.

FIG. 13H depicts a list generated by performing homoglyph replacement in accordance with implementations of the disclosure.

FIG. 13I depicts a list generated by performing homoglyph replacement in accordance with implementations of the disclosure.

Figure 1:
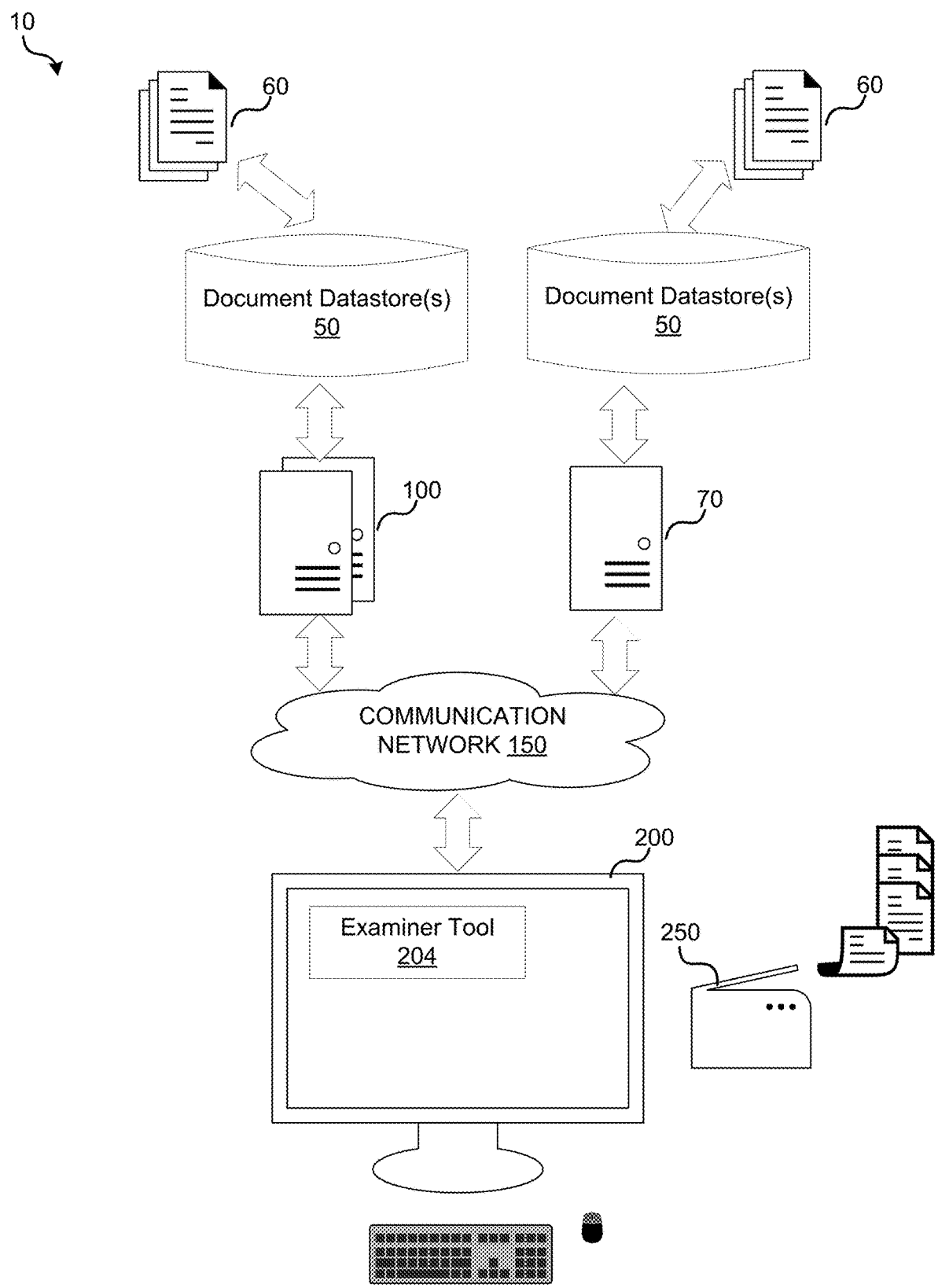
FIG. 1 depicts an example environment in which OCR error correction may be implemented, in accordance with implementations of the disclosure.

The figures are not exhaustive and do not limit the present disclosure to the precise form disclosed.

DETAILED DESCRIPTION

As used herein, the term "character" refers to the smallest functional unit of a writing system such as in an alphabet or syllabary in the written form of a natural language, e.g., alpha, numeric, symbols, punctuation, etc.

As used herein, the term "token" refers to a string of contiguous characters. The contiguous characters may be between two spaces or between a space and punctuation marks. A token may also bean integer, real, or a number with a colon (e.g., the time 2:00). All other symbols may be tokens themselves except apostrophes and hyphens in a word (with no space). This token definition does not follow grammatical forms usually employed in tokenization, but rather seeks to maintain the concept of a word without decomposing it into its grammatical pieces, e.g., we consider the possessive "John's" as one token rather than tokenizing it to "John", "'s". We have found that preserving complete words leads to better results for correction and other Natural Language Processing applications within our discipline.

As used herein, to "tokenize" text refers to splitting a stream of text into an ordered list of tokens. For example, the sentence "Mrs. O'Leary's cow kicked over the lantern which caused the great Chicago fire." may be tokenized as follows: ["Mrs.", "O'Leary's", "cow", "kicked", "over", "the", "lantern", "which", "caused", "the", "great", "Chicago", "fire", "."]

As used herein, the term "glyph" refers to a visual representation of a character within a set of symbols and intended to represent a readable character for the purposes of writing.

As used herein, the term "homoglyph" refers to one of two or more characters, glyphs or graphemes with shapes that appear similar or identical.

As used herein, the term "corpus" refers to a collection of words associated with a subject, topic, or discipline.

As used herein, the term "grapheme" refers to one or more letters that represent a sound in a word.

As discussed above, OCR error correction remains incapable of converting poor quality physical documents at 100% correctness. Although various OCR error correction tools are in use, these tools may have one or more drawbacks, including: inefficient use of computing resources (e.g., memory intensive search algorithm), low error correction accuracy, reliance on deterministic rules that do not address new variations of spellings, and/or reliance on manually-intensive workflows.

For example, some current applications of OCR correction in the field of real estate title automation employ a set of deterministic rules—each addressing some observed failure which occurs during the OCR process. For example, if the word "wipe" appears in vesting-related document, a rule will convert that word to "wife". In addition to requiring frequent updating to account for new or changed rules, deterministic approaches may not address new variations of spellings caused by homoglyph errors.

The business of providing title insurance for real estate transactions (i.e., title clearance and insurance) relies heavily on previously stored documents relating to title for a particular parcel of real property. These documents may comprise deeds, mortgages, surveys, and various other documents relating to a parcel of real property. A title company may own or have access to electronic copies of such documents, typically stored in one or more datastores as text and/or image files, e.g., pdf, png, tiff, etc. In either case the stored data may be unstructured, which typically requires further processing of the data to comprise useful information, or structured, which typically comprises data that is useful in the context of this disclosure. This further processing of the data may include performing optical character recognition (OCR) on the unstructured data (e.g., image files). As the title insurance process develops and automates, the need to obtain timely and accurate textual information from such documents and files increases. For example, automation in this context may result in fewer human "touches" in the title clearance and insurance process, with computers providing a faster and more reliable source of certain types of information. Specifically, and relating to legal and vesting description relating to a parcel, automation can extract relevant and accurate legal and vesting information from these previously stored files or documents, convert it to structured text, and use that text as input to inform or validate certain aspects of the title clearance and insurance process. Accuracy is critical in the text obtained from the document or file, as an insurance policy and the obligation of the insurer will at least partially rely and be based upon this information.

A software tool utilized by a human examiner for carrying out a title clearance and insurance process relating to title for a parcel of real property may require certain text information from documents relevant to the task of assessing title for the parcel. That text information may comprise a legal description and a vesting description. As part of the process, the tool may identify relevant documents, request OCR of those documents, and receive OCRd text from the documents. That OCRd text may be further used by the tool to make a determination as to the legal and vesting status for the parcel. Alternatively, the text may be used as a binary indicator for that status. In either case, the accuracy of the OCRd text may be paramount.

Some current applications of OCR correction in the field of real estate title insurance use supervised machine learning algorithms that require title preparation personnel to label (record) their changes to documents in a very specific manner to provide input as training material for deep learning models. Manually labeling as described may be a very costly operation and slows down the title-generation process. Also, in typical title preparation, personnel may correct for both errors generated by OCR as well as nonstandard title representations (due to misspellings or title preference) which must be addressed to generate a valid title document. For example, the misspelling "fourty" and the homoglyph error "forfy" may both be corrected to "forty," but the source of error is not considered. A combination of corrections for both spelling and homoglyph errors may be problematic for model development for machine learning models which target correcting OCR errors.

OCR errors may be attributed to errors with homoglyphs extracted during the OCR process. Examples of such errors are depicted by Table 1, below, which shows examples of an extracted glyph source (source) and the correct glyph (target).

TABLE 1

| Target | Source |
|--------|--------|
| A | fi /\ |
| a | ci ä à á |
| B | 8 $ |
| b | h lo |
| C | ( o ⊂ ℭ |
| ... | ... |
| 8 | B $ 3 |
| 9 | q |

A simple but ineffective approach sometimes implemented to correct homoglyph errors is to use a common spell checker. This approach may carry a very low success rate because it uses an uninformed approach in correction—only working towards a correct spelling without considering the cause of the error, which may be important in choosing how to correct the error. For example, the optimal approach to correct misspelled words (by a human) may be different than the algorithm to fix homoglyph errors due to scanning a document (mistakes by the computer).

As the foregoing examples illustrate, there is a need for improved OCR error correction techniques. To this end, implementations of the disclosure provide a novel and innovative method capable of fast, efficient, and accurate validation and/or correction of OCRd text obtained from a document image (e.g., a PDF or tiff file). The systems and methods described in the present disclosure may accomplish this using less computer memory and with faster processing times than conventional OCR validation and error correction techniques.

The improved OCR error correction systems and methods of the present disclosure may utilize a plurality of filters, some iteratively, some once, to quickly and efficiently correct one or more tokens obtained from a subject document with a high degree of accuracy and confidence. In some implementations, the OCR error correction techniques described herein may include: receiving text comprising a token; determining a token bigram from the beginning or ending of the token; searching, based on the token bigram and a mapping between words in the corpus and a corpus bigram set comprised of unique bigrams from the beginning or ending of the words in the corpus, a corpus for a best word to replace the token; and replacing the token with the best word.

By virtue of implementing the OCR error correction systems and methods described herein, improvements in the operation of the computer, including, by way of non-limiting example, faster processing and/or reduced memory requirements are realized while maintaining a high level of error correction accuracy. As further discussed below, the OCR error correction techniques described herein may result in an efficiency that is orders of magnitude better than conventional OCR error correction techniques.

In some implementations, the methods described herein may be implemented as part of a software tool used in the title clearance and insurance process, discussed above. It should be noted, however, that although some of the OCR error correction systems and methods described herein are described with respect to real estate-related documents, and particularly title documents containing legal descriptions and/or vesting phrases, one having ordinary skill in the art reading this description would fully appreciate and understand that the various embodiments could be applied to other fields and industries not pertaining to real estate or title examination.

FIG. 1 depicts an example environment 10 in which OCR error correction may be implemented, in accordance with implementations of the disclosure. As depicted, environment 10 includes a plurality of interconnectable computing devices and systems including a server system 100 comprising or having access to one or more document datastores 50 having stored therein or thereon a plurality of documents 60. The environment 10 further includes a client device 200 having installed thereon an examiner tool 204 usable by an examiner as part of a title clearance and insurance process. The environment 10 still further includes a document server 70 having access to one or more document datastores 50 having stored therein or thereon a plurality of documents 60. At least one of the server system 100 and document server 70 is configured to retrieve an image file of a document and to perform OCR to extract text from that image file. At least one of the server system 100 and document server 70 are further configured to create a text file of the OCRd text. Each of the systems and devices included in the environment 10 are configured to communicate over communication network 150. FIG. 1 will be described in conjunction with FIG. 2, which shows a block diagram of example components of server system 100 and client device 200, in accordance with implementations of the disclosure. Although the description provided herein is directed to the server system 100, it will be understood by a person skilled in the art from this disclosure that such description also applies to the document server 70 to the extent of their similar components and functionalities.

Server system 100 has access to a large number of documents 60 via one or more datastore(s) 50 (e.g., databases, file servers, systems of record, etc.). Each document 60 may be stored as an image file and may be subject to an OCR process to extract relevant text. The OCR process may be performed by one of the server system 100 and/or document server 70. In operation, server system 100 is configured to: obtain OCRd text from one or more documents 60; create or access a corpus 111; create a bigram filter 112 based on a set of unique bigrams extracted from the beginning or end of the words of the corpus; create a bigram to corpus mapping 113 between each of the unique bigrams and the words of the corpus beginning or ending with the bigram; create an allowable character filter 124 used to eliminate characters and glyphs from consideration that would never occur in a corpus for a particular application, e.g., diacritics, capital letters, numbers, etc.; and create a probability filter 119 that determines a probability of occurrence for each word in the corpus. As further described below, the corpus 111, bigram filter 112, mapping 113, allowable character filter 124 and probability filter 119 may be used to implement embodiments of the OCR error correction techniques described herein.

The one or more datastore(s) 50 may store hundreds, thousands, or even millions of documents 60. Some of these documents may have been digitally created. Some of these documents may have been created by OCRing images of the documents to make them computer readable or to extract text from the documents. During the OCR process, certain errors generated during conversion of the document image to computer readable text may have been corrected. For example, one or more image pre-processing rules (e.g., de-skewing, de-speckling, binarization, line removal, normalization of aspect ratio and scale, etc.) may have been applied prior to performing OCR operations on the document image. Additionally, human analysts may have manually reviewed the textual data representation of the document image to further refine or improve the quality of the OCR process. In some instances, the OCR process and manual human review may have been iteratively performed. As further described herein, leveraging the datastores 50 of documents 60 and a database of relevant text extracted from these documents and which may be stored on any of the datastore 50, in memory of the server system, document server 70 and/or client device 200, enables creation of a robust, application-specific corpus 111 of words. This corpus 111 may subsequently be utilized during OCR error correction, in accordance with the disclosure.

By way of example, in the real-estate title industry the documents 60 may be title documents that have within them legal and/or vesting descriptions, phrases, etc. and the datastore(s) 50 may include servers and/or databases of title companies (e.g., transactional title or escrow systems that generate title commitments or title policies that another system may interact with via a web service), title plants, and the like. In such implementations, server system 100 may be an enterprise server system associated with a title company.

Client device 200 may be a user device that enables an authorized user (e.g., examiner) to access the enterprise server system 100. All or part of an examiner tool 204 may be stored in at least one computer readable medium 210 of the client device 200 and may be accessible by the user via a graphical user interface (GUI) or other known interface means. In one embodiment, the examiner tool 204 may call or access a REST API to access the server system 100 and/or document server 70.

In one embodiment, OCR is performed by software resident in at least one computer readable medium of at least one of the server system 100 or document server 70. When OCR is required of a selected document, one of the server system 100 or document server 70 accesses an image file of the identified document and performs OCR on that document to extract relevant text contained within the document. That relevant text is tokenized to create one or more tokens. The one or more tokens may then be subject to error correction in accordance with implementations of the disclosure. Alternatively, client device 200 may be configured to perform one or more of the aforementioned functions. For example, client device 200 may perform OCR using an imaging device 250. Client device 200 may also tokenize the relevant text and perform error correction of the relevant tokens. Although depicted as a desktop computer, client device 200 may be implemented as a smartphone, laptop, tablet, or other suitable device that may OCR textual images and perform the OCR error correction methods described herein. Although depicted as a scanner, imaging device 250 may be implemented as some other imaging device (e.g., smartphone camera or other computer camera).

In some embodiments, the examiner tool 204 receives from server system 100 relevant text extracted from selected documents validated and corrected in accordance with implementations of the disclosure—that text being taken as input and used by the tool 204 to render certain decisions regarding title for the subject parcel. Alternatively, the tool 204 receives a value indicating a condition of the OCRd text, e.g., match or no match.

Figure 2:
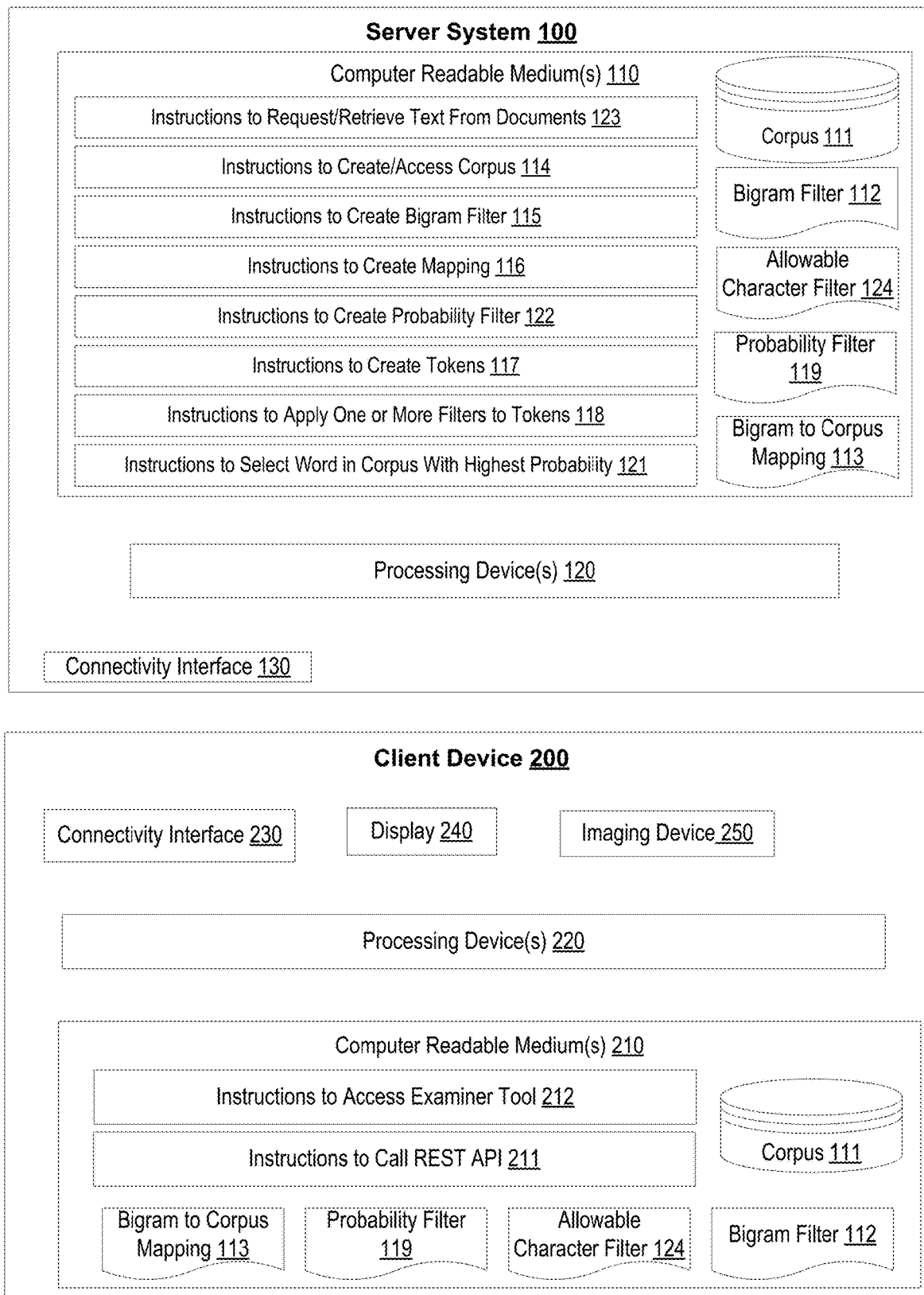
FIG. 2 shows a block diagram of example components of the server system and the client device of FIG. 1, in accordance with implementations of the disclosure.

Referring to FIG. 2, server system 100 comprises at least one computer readable medium 110 upon which are stored instructions that, when executed by a processing device 120 cause server system 100 to carry-out implementations of the disclosure. Server system 100 further comprises, at least one processing device 120, and a connectivity interface 130. In this example, at least one computer readable medium 110 stores corpus 111, bigram filter 112, bigram to corpus mapping 113, allowable character filter 124 and probability filter 119. The at least one computer readable medium 110 also stores instructions 123 that, when executed by a processing device 120, causes server system 100 to request and/or retrieve extracted OCR text from documents 60. The at least one computer readable medium 110 also stores instructions 114 that, when executed by a processing device 120, causes server system 100 to create and/or access a corpus 111. The at least one computer readable medium 110 further stores instructions 115 that, when executed by a processing device 120, causes server system 100 to create a bigram filter 112. The at least one computer readable medium 110 also stores instructions 116 that, when executed by a processing device 120, causes server system 100 to create a mapping 113 between words of corpus 111 and bigrams in the bigram filter 112. The at least one computer readable medium 110 further stores instructions 117 that, when executed by a processing device 120, causes server system 100 to create one or more tokens from the extracted OCR text. The at least one computer readable medium 110 further stores instructions 122 that, when executed by a processing device 120, causes server system 100 to create a probability filter 119. The at least one computer readable medium 110 further stores instructions 118 that, when executed by a processing device 120, causes server system 100 to apply one or more filters to the one or more tokens. The at least one computer readable medium 110 further stores instructions 121 that, when executed by a processing device 120, causes server system 100 to use the probability filter 119 to select a word in the corpus 111 having a highest probability of being a correct word. In some implementations, corpus 111, bigram filter 112, bigram to corpus mapping 113, allowable character filter 124, and/or probability filter 119 may be stored in one or more binary files. Each of the foregoing are further described herein.

As discussed above, due to the inherent limitations of OCR, the OCR application typically does not convert the image of text to computer readable text with 100% accuracy. As such, errors may result from the image to text conversion. The systems and methods described herein may correct such OCR errors using, creating and/or accessing a plurality of filters and an application/language-specific corpus 111 to quickly, efficiently and accurately determine the correct word corresponding to a token representing OCR text from a document. Some of the filters may be used iteratively, some may be used once. For example, allowable character filter 124, bigram filter 112 and mapping 113 may be used iteratively, and probability filter 119 may be used once. Thus, the techniques described herein may provide an efficient homoglyph replacement algorithm that, for each token that was erroneously OCRd, efficiently searches for a best candidate word in corpus 111 using one or more filters to identify and select a word in the corpus 111 most likely to be the correct word. The OCR correction techniques described herein may utilize less computer memory and processor time, resulting in improved operation and performance of the computer.

Connectivity interface 130 is configured to provide server system 100 with wired and/or wireless communication with datastore(s) 50, client device 200, and/or document server 70 via a direct and/or indirect connection over one or more communication networks.

Client device 200 comprises at least one computer readable medium 210, at least one processing device 220, connectivity interface 230, display 240, a software tool 204 and imaging device 250 which, as previously noted, may be configured as software only, or a combination of software and hardware. Also as previously noted, the OCR function utilized by implementations of the disclosure may be carried out solely by the server system 100 and/or document server 70. The at least one computer readable medium 210 further stores instructions 212 that, when executed by a processing device 220, causes client device 200 to access a software tool 204 utilized by a user of the client device 200, i.e., usable by an examiner to carry out certain parts of a title clearance and insurance process. The at least one computer readable medium 210 further stores instructions 211 that, when executed by a processing device 220, causes client device 200 to call a REST API 202 that will return relevant text from the subject document(s) that have been processed as described herein.

A plurality of filters may be advantageously utilized to quickly reduce the number of possible words for a token representing text extracted from a document relevant to title clearance and insurance for a parcel of real property. To enable efficient searching of candidate words during OCR error correction, an application-specific and/or language-specific corpus may be utilized. For example, a corpus for a specific application, such as, by way of non-limiting example, real property title insurance, comprises a small subset of the complete English language corpus and thus only contains words relevant to title clearance and insurance for real property.

Figure 3:
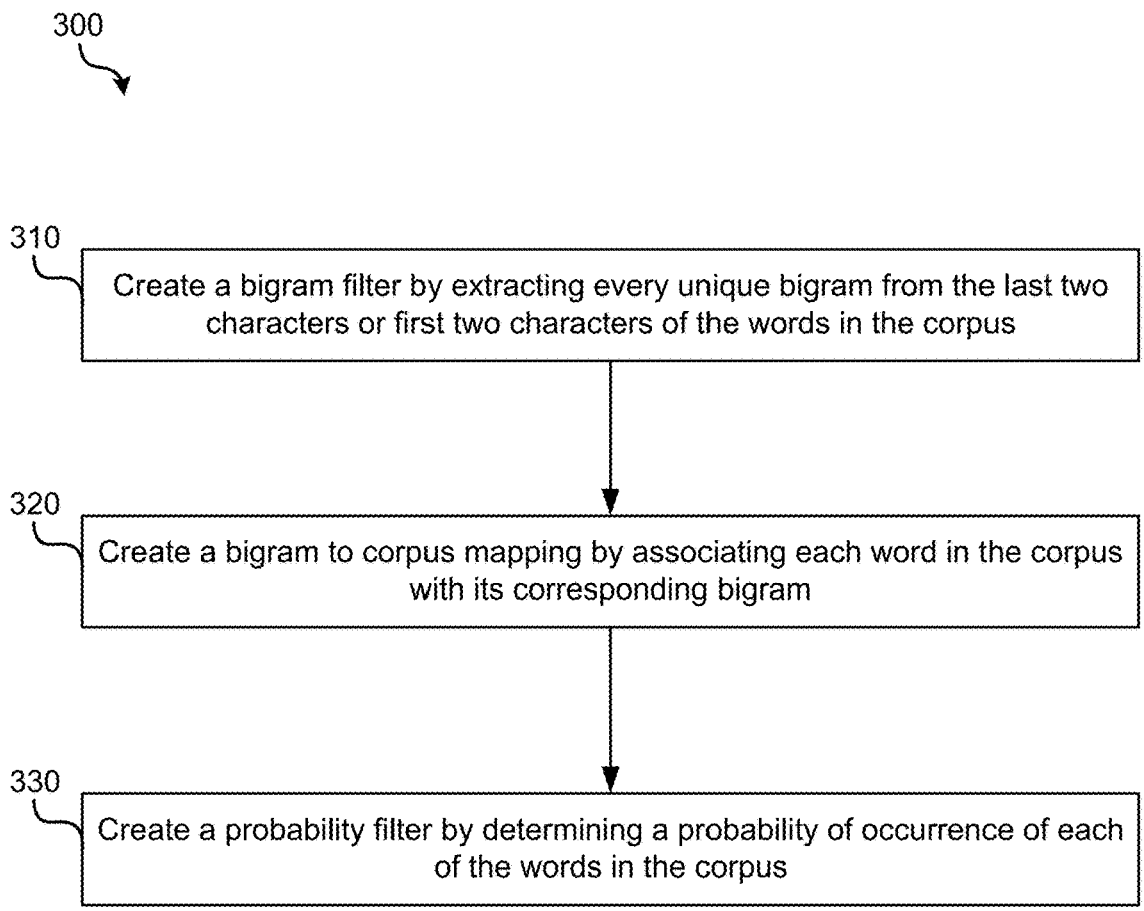
FIG. 3 is a flow diagram illustrating an example method for creating a probability filter, a bigram filter, and bigram to corpus mapping, in accordance with implementations of the disclosure.

FIG. 3 is a flow diagram illustrating steps 300 of creating a probability filter 119, a bigram filter 112, and a bigram to corpus mapping 113 in accordance with implementations of the disclosure. At operation 310, a bigram filter 112 is created by extracting the last two characters and/or first two characters of each word of length two or more in the corpus 111 and creating a set of unique bigrams occurring in the corpus 111. At operation 320, a bigram to corpus mapping 113 is created by associating each word in the corpus 111 with the bigram in the set of unique bigrams corresponding to the first two letters or last two letters of the word, creating a small set of keyed words that can be used to reduce the total size of potential word possibilities when correcting a token. This mapping 113 creates groups of the words of the corpus 111 based upon each words first and/or last two characters where all the words in a group end in the same last two letters or begin with the same two first letters. For example, the words "vesting" and "living' both fall into the group with words ending in "ng" while "wife" and "life" are in the group ending with "fe". This reduces the time it takes to search the corpus 111 for a suitable word to replace a token.

At operation 330, a probability filter 119 is created by identifying each word in the corpus 111 and determining the percentage occurrence of each of these words in the corpus 111.

The mapping 113 provides a means of looking up, for each of the bigrams of the set of unique bigrams, all words in the corpus that end with the bigram (in the case where bigrams were extracted from the end of the corpus words), or all the words in the corpus that begin with the bigram (in the case where bigrams were extracted from the beginning of the corpus words). As further discussed below, this lookup function may eliminate large sets of potential combinations of partial token strings, thereby significantly improving the search speed for a candidate token by the OCR error correction algorithms described herein.

In some implementations, the mapping 113 may be implemented using a lookup table or other suitable data structure that includes the set of bigrams and the mapping between each of the bigrams and words of the corpus. For example, consider the case of the "ng" bigram character. A mapping between this bigram "ng" and words in the corpus may be expressed as, for example ng: [vesting, jesting, testing, . . . ], where the brackets include every corpus word ending in "ng".

To understand the benefits of utilizing bigrams in accordance with the disclosure, it is instructive to consider that many languages, including English which has 728 unique bigrams, have a limited set of characters which appear in sequence. For example, in English, all non-borrowed English words must have a "u" after a "q". In some implementations, the set of valid bigrams may be the unique set of bigram characters occurring at the end of words of length two or greater in the corpus. Thus, the set of valid bigrams may be utilized as a bigram filter that may be applied to any token to quickly determine whether the last two characters of the token are the same as the last two characters of any word in the corpus. As further described below, the bigram filter 112 may be applied to a token by determining the last two characters of the token (e.g., obtained from OCRd text) and the homoglyphs of the last two characters homoglyphs; and determining combinations from the last two characters and their associated homoglyphs. The bigram filter 112 may be configured as binary filter that returns a true value if the last two characters are valid, and otherwise returns false. Alternatively, the bigram filter 112 may be similarly applied to the first two characters, in which case a set of valid bigrams may be the unique set of bigram characters occurring at the beginning of words of length two or greater that are in the corpus. In such implementations, the set of valid bigrams may be configured as a bigram filter 112 that determines if the first two characters are valid.

In some implementations, the corpus is an application and/or language specific corpus that contains only words relevant to a particular application and/or language. For example, the corpus 111 may contain words relevant to a legal description and/or a vesting description contained in documents relevant to a title clearance and insurance process for a parcel of real property. An example corpus 111 may be constructed by collecting a large group of vesting and legal documents from a database of titles. A collection of common names from census data and other sources (e.g., customer databases) may be assembled, as well as a collection of state, city, county, and street names from available data. All vesting phrases can be tokenized, and names and place names removed from the tokenized data. However, this does not guarantee that all name and place names are removed, but it eliminates the most common first and last names plus location names. For all the tokens (words) which remained, the number of times that each word occurs as well as a count of every word which appears in the modified token list enables determining a probability of occurrence for each remaining word. The probability of a word occurrence can be calculated by dividing the number of times a word occurs by the total number of words. What remains is a corpus of words minus most common place and people names. Some care may be taken not to remove names which were also common words in the corpora. This results in the generation of two corpora, one for legal descriptions and one for vesting phrases.

The OCR error correction methods described herein may benefit from a corpus 111 comprised only of relevant words. By way of illustration, FIG. 4 shows the top ten most common words and their associated probabilities for two corpora created from legal descriptions and vesting phases, respectively, following some of the techniques described herein. In this example, percentages were measured across over 512,000 and 159,000 distinct words respectively for legal descriptions and vesting phrases to determine a probability of each word occurring in the corpus, providing input for the probability filter 119. Notably, there are no shared words in the top ten words, which provides an indication of the advantage of using application-specific corpora.

In some implementations, performance of the OCR error correction methods described herein may be optimized by creating an allowable character filter 124 that limits the set of characters that may be used as replacement characters. In such implementations, where an English corpus is used the allowable character filter 124 may be tailored to the English language. In such implementations, the allowable character filter 124 may exclude diacritics from consideration as a replacement character. The exclusion of diacritics from consideration may be particularly advantageous in implementations where a name token filter was utilized to generate the corpus. The advantage of this approach may be understood from the observation that there are very few words in English, outside of names, that use diacritics such as the word "naïve" (a word borrowed from French). In some applications, there may be zero words outside of names that use diacritics. For example, in the vesting and legal corpora example discussed above there are zero words which are not proper nouns that use diacritics. In some implementations, the allowable character filter 124 may disallow words with embedded numbers. In some implementations, the allowable character filter 124 may disallow capitalization except in instances where the letter is the first letter of the word.

Figure 5:
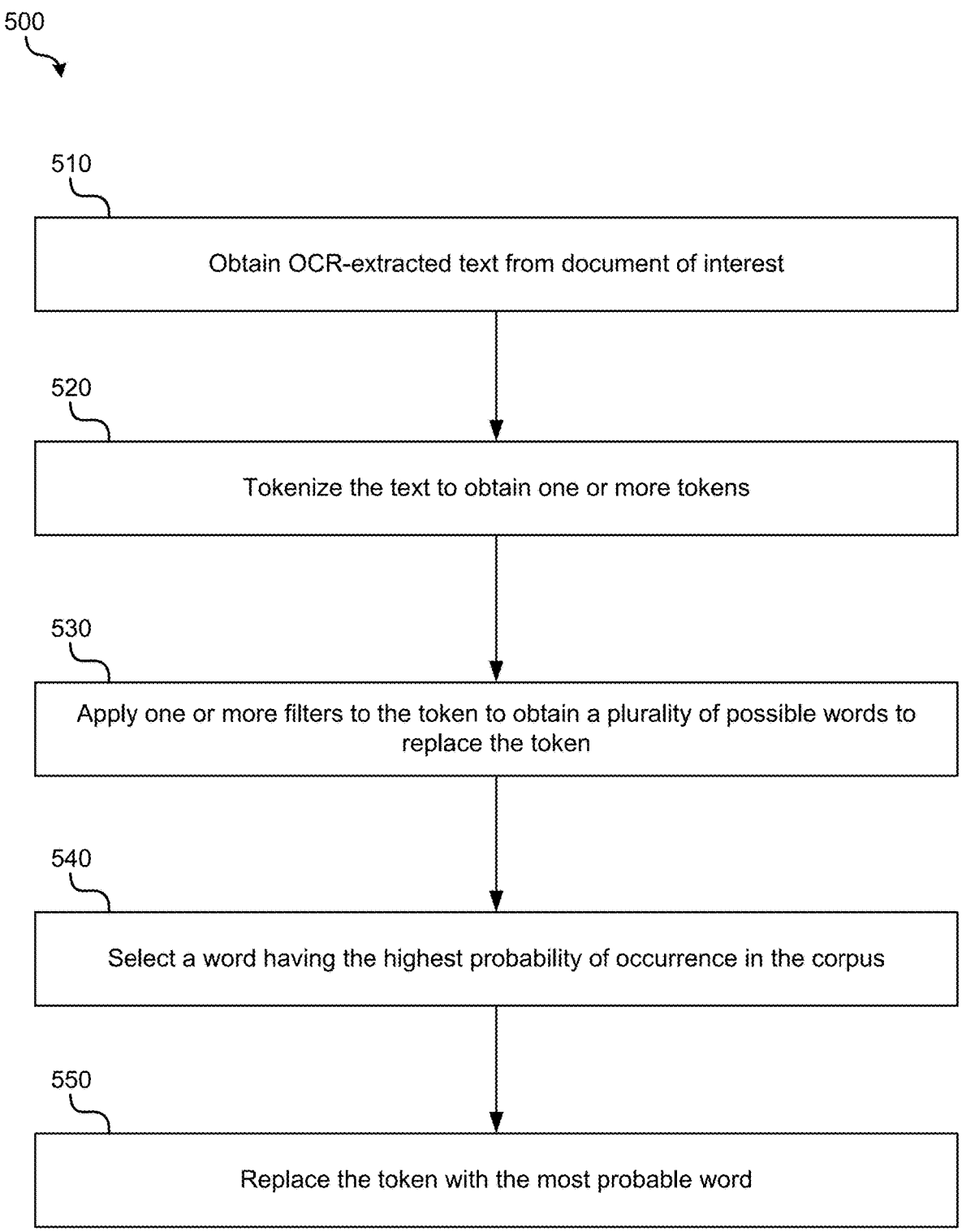
FIG. 5 depicts a flow diagram illustrating a method implementable by a system in accordance with implementations of the disclosure to obtain OCR text of a document and correct errors resulting from OCRing the document.

FIG. 5 depicts a flow diagram illustrating a method 500 implementable by a system in accordance with implementations of the disclosure to obtain OCRd text of a document and provide correction of errors resulting from OCRing the document. In some implementations, method 500 may be implemented by at least one processing device 120 of server system 100 executing one or more of instructions stored in memory thereof. Alternatively, a method as depicted in FIG. 5 may also be carried out by or with the document server 70. Although method 500 will be described in the context of performing OCR error correction for tokens of text extracted from a single document image, it should be appreciated that method 500 may be performed to correct errors resulting from OCRing multiple documents.

At operation 510, OCR-extracted text is obtained from a document of interest. The OCR-extracted text may be obtained in response to a request for a document or a command to retrieve a document, where the document is an image file and the desired text is obtained by OCR of the image file to extract desired text from the document of interest. In some implementations, the document of interest may relate to a parcel of interest. The server system 100 may identify the document of interest using a uniform resource locator (URL) indicating the location of an image file of the document. The server system 100 may obtain a copy of that image file and carry out OCR on that file to extract certain text from the document.

That OCRd text may be corrected as further described below to obtain correct and accurate text (i.e., words). In some implementations, corrected text (i.e., text obtained after operation 550) is communicated by the system server 100 to client device 200 via examiner tool 204. Alternatively or in addition, all or part of the foregoing functions may also be carried out by the document server 70.

At operation 520, the extracted text is tokenized to obtain one or more tokens, with each token representing a word. Each token comprises a plurality of token parts, each of which may be a character, a glyph, a grapheme or a homoglyph. Thereafter, operations 530-550 may be performed for each of the tokens. In some implementations, prior to performing operations 530-550, the extracted text may be reviewed to determine if there is an error with the token. For example, the token may be run through a spell-checker. In some implementations, a correctly spelled token may be searched for in the corpus to identify token errors in tokens that are actual words, e.g., "wipe" (token) vs. "wife" (actual word). If no error is identified for a given token (e.g., token is spelled correctly and corresponds to a token in the corpus), operations 530-550 may be skipped for that token. Alternatively, operations 530-550 may be performed for a token without first reviewing the token to determine if it has an error.

At operation 530, one or more filters are applied to the token to obtain a plurality of possible words for the token. The filters may be applied iteratively or once to part(s) and/or all of a token to identify one or more possible words in the corpus that could be the token. As used herein and with respect to performing operations, "iteratively" refers to performing operations by sequentially traversing the token, starting from the last and/or first token part and ending at the first and/or last token part. As further described below, after the first iteration, computational performance (e.g., usage of memory and/or processing resources) may be significantly improved during each subsequent iteration by filtering out large sets of potential partial candidate word entry portions from the list using the bigram set and mapping. After the last iteration, the list comprises the candidate words.

The filters may limit characters that may be present in a word, words that may be present in the corpus, and/or words having a matching bigram in their last and/or first two characters. Operation 530 may proceed by applying at least one of the of filters to the last and/or first two token parts, and applying at least one of the filters to each next token part until all parts of the token and the entire token have been considered. Through this process the number of possible words that may be the token is steadily reduced.

The filters may comprise an allowable character filter 124, a bigram filter 112, and a bigram to corpus mapping 113. The allowable character filter 124 may be applied to each token part. In some implementations, one or more of allowable character filter 124, a bigram filter 112, and a bigram to corpus mapping 113 are iteratively applied at operation 530. In some implementations, bigram filter 112 is applied only in the first two iterations, or when the part of the token or part of the token being analyzed comprises two or fewer token parts.

At operation 540, a word having the highest probability occurrence in the corpus is selected to replace the token. Operation 540 may be performed after the one or more filters have been applied to each token part to generate a list of possible words from the corpus to replace the token. In some implementations, the probability filter 119 may be used to filter the final word or word possibilities by percentage rank ordering of each word's occurrence in the corpus. This rank ordering enables identification of the word among the list of possible words most likely to be found in the corpus, and thus most likely to be the word that should replace the token. In instances where the list of possible words has only one possible word, the one possible word may be selected without considering its ranking. Particular implementations of operations 530 and 540 are set forth in further detail in FIGS. 7-8.

At operation 550, the token is replaced with the word having the highest probability of occurrence in the corpus (i.e., the most probable word).

Figure 6:
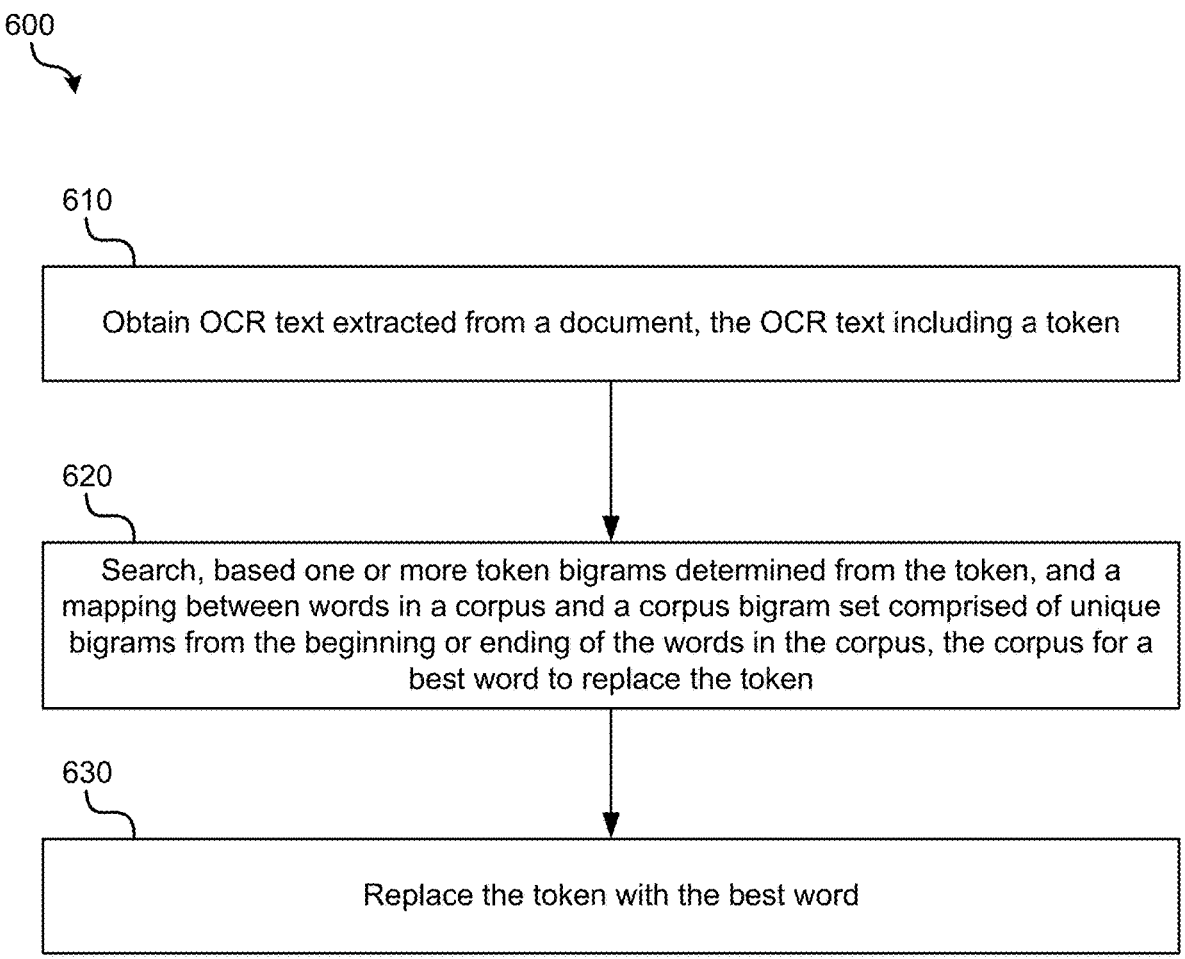
FIG. 6 depicts a flow diagram illustrating a method implementable by a system in accordance with implementations of the disclosure to obtain OCRd text of a document and correct errors resulting from OCRing the document.

FIG. 6 depicts a flow diagram illustrating a method 600 implementable by a system in accordance with implementations of the disclosure to obtain OCRd text of a document and correct errors resulting from OCRing the document. In some implementations, method 600 may be implemented by at least one processing device 120 of server system 100 executing one or more of instructions stored in memory thereof. Alternatively, a method as depicted in FIG. 6 may also be carried out by or with the document server 70.

At operation 610, OCR text extracted from a document image is obtained. The OCR text includes a token.

At operation 620, a corpus is searched for a best word to replace the token. The search for the best word is based on one or more token bigrams determined from the token, and a mapping between words in the corpus and a corpus bigram set comprised of unique bigrams from the beginning and/or ending of the words in the corpus. Particular implementations of operation 620 are described below with reference to FIGS. 7-11.

In some implementations, searching the corpus for the best word comprises determining the one or more token bigrams. The one or more token bigrams may be determined by performing operations including: determining one or more homoglyphs of: each of the first token part and the second token part of the token; or each of the last token part and the second-to-last (penultimate) token part of the token; and determining, based on combinations of the homoglyphs and the first two characters or the last two characters, the one or more token bigrams. A particular implementation of determining the one or more token bigrams is described below with reference to FIGS. 7 and 9-11.

At operation 630, the token is replaced with the best word.

Figure 7:
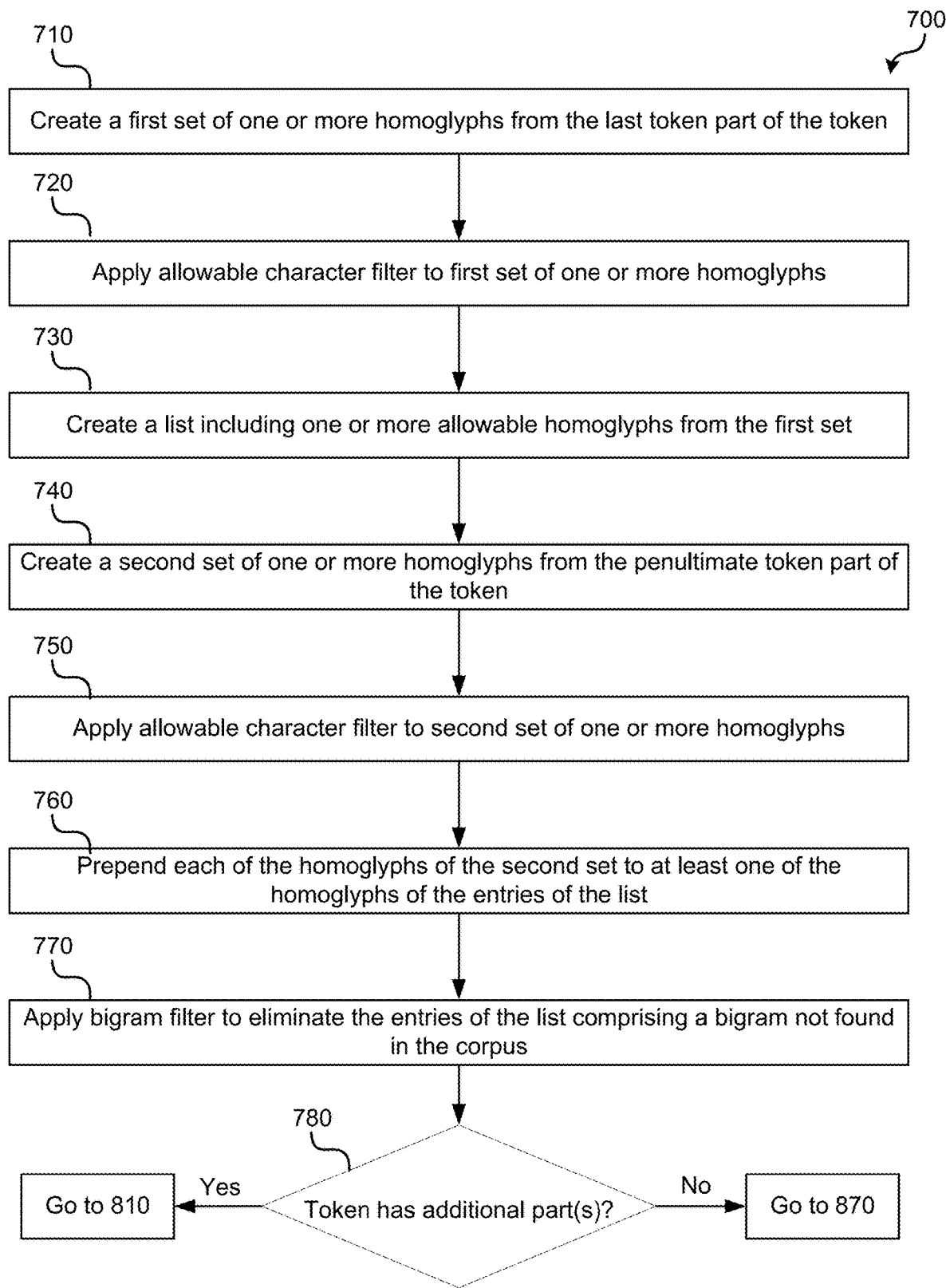
FIG. 7 depicts a flow diagram illustrating part of a method implementable by a system in accordance with implementations of the disclosure to correct a token obtained from OCRd text.
Figure 8:
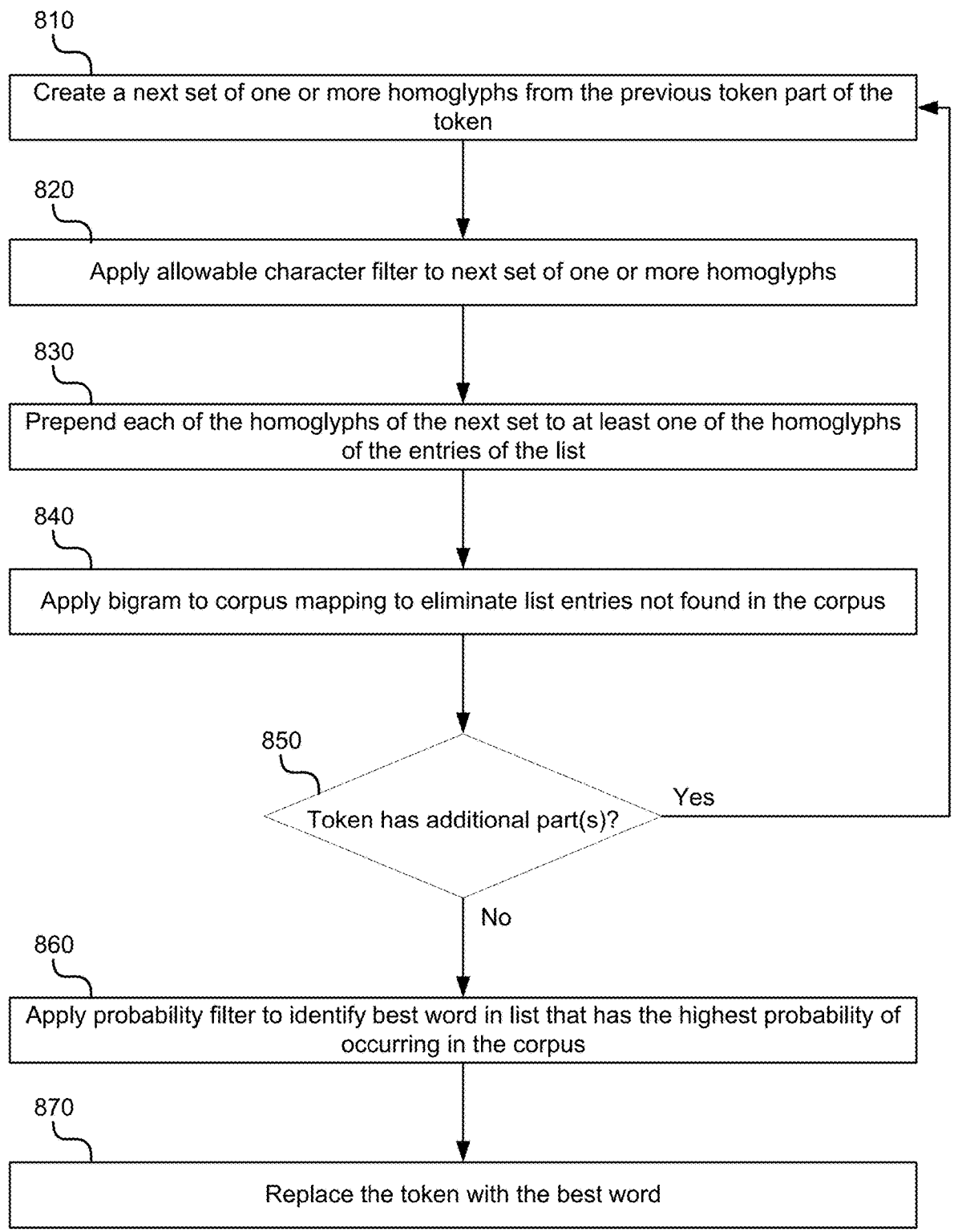
FIG. 8 depicts a flow diagram illustrating part of a method implementable by a system in accordance with implementations of the disclosure to correct a token obtained from OCRd text.

FIGS. 7-8 depict a flow diagram illustrating a method 700 implementable by a system in accordance with implementations of the disclosure to correct a token obtained from OCRd text. Although described in the context of correcting a token by updating a list starting from the last token part and sequentially working to the first token part, it should be appreciated that method 700 may instead be implemented by updating a list starting from the first token part and sequentially working to the last token part.

At operation 710, a first set of one or more homoglyphs is created for the last token part. The homoglyphs may be read from a list, table, or other data structure that provides a mapping between glyphs and homoglyphs. One such example of a table listing homoglyphs for glyphs is shown by Table 2, below.

TABLE 2

| Glyph | Homoglyphs |
|---|---|
| A | fi ∧ Q D |
| fi | A |
| ∧ | A |
| a | ä á ci à |
| ä | a |
| à | a |
| á | a |
| B | 3 8 $ |
| 8 | 3 $ B |
| $ | 3 8 B |
| b | h lo |
| h | b |
| lo | b |
| C | 0 G ( C ₡ |
| ( | c C |
| 0 | A C O D ä à o á Q |
| C | C |
| ₡ | C e |
| c | o ( e g |
| e | o c é ë ₡ |
| o | 0 o D o c o Q e b |
| D | 0 A Q O o |
| O | 0 ö D ò ó Q |
| Q | 0 D A O o |
| d | ci cl |
| cl | d |
| E | F |
| F | P E |
| ë | e |
| é | e |
| P | F Y |
| f | p t |
| P | g y f q |
| G | 6 C |
| 6 | G |
| G | 9 p cj q |
| Cj | g |
| 9 | g q |
| Q | 7 9 g p |
| H | N |
| N | H M |
| I | 7 T i | L |
| I | 1 I l ì í ï e |
| 7 | T ' ' ' t I q |
| | | l I |

TABLE 2-continued

| Glyph | Homoglyphs |
|---|---|
| T | 7 1 j I |
| L | 1 T i | |
| ï | i |
| í | i |
| ì | i |
| Ï | i |
| J | y |
| Y | j J p v u x |
| J | T y |
| K | R X |
| R | K |
| X | K |
| K | x |
| X | y k |
| 1 | l i |
| M | N |
| M | nn rn |
| Rn | m |
| Nn | m |
| N | ri r rr |
| r | n |
| ri | n |
| ö | 0 O o |
| ò | 0 O o |
| ó | 0 O o |
| Y | P |
| S | 5 |
| 5 | s S |
| s | 5 |
| t | 7 7' f |
| U | V |
| V | U |
| u | y ii v li a |
| v | u y |
| ii | u |
| W | VV |
| VV | W |
| w | vv |
| vv | w |
| A | 0 |
| 2 | Z z |
| z | 2 c |
| Z | 2 |
| 3 | 8 $ B } |
| } | 3 |
| ' | \ |
| \ | ' |
| , | . |
| . | , |
| 7' | t |
| ∧ | i |
| ‾ | . |
| 'c | w |
| /c | x |

By way of example, consider the input token "yé57iriq", which has last character q. As shown in Table 2, the homoglyphs associated with q include {7, 9, g, p}. The first set of homoglyphs in this example may comprise {q, 7, 9, g, p}.

At operation 720, the allowable character filter 124 is applied to the first set of homoglyphs associated with the last token part of the token. In particular, the OCR error correction methods described herein may be optimized by applying the allowable character filter 124 to each homoglyph to limit the set of characters that may be used as replacement characters for each token part. In some implementations, the allowable character filter 124 may disallow numbers. For instance, applying the allowable character filter to the foregoing example of {q, 7, 9, g, p} yields {q, g, p}. In some implementations, the allowable character filter 124 may disallow capitalization except in instances where the letter is the first letter of the first word of a sentence, or in other instances where capitalization may be appropriate. In implementations where an English corpus is used, the allowable character filter 124 may be tailored to the English language. In such implementations, the allowable character filter 124 may exclude diacritics from consideration as a replacement character. The exclusion of diacritics from consideration may be particularly advantageous in implementations where names were excluded from the corpus. The advantage of this approach may be understood from the observation that there are very few words in English, outside of names, that use diacritics such as the word naïve (a word borrowed from French). For example, in the vesting and legal corpora example discussed above, there may be zero words which are not proper nouns that use diacritics.

Figure 13A:
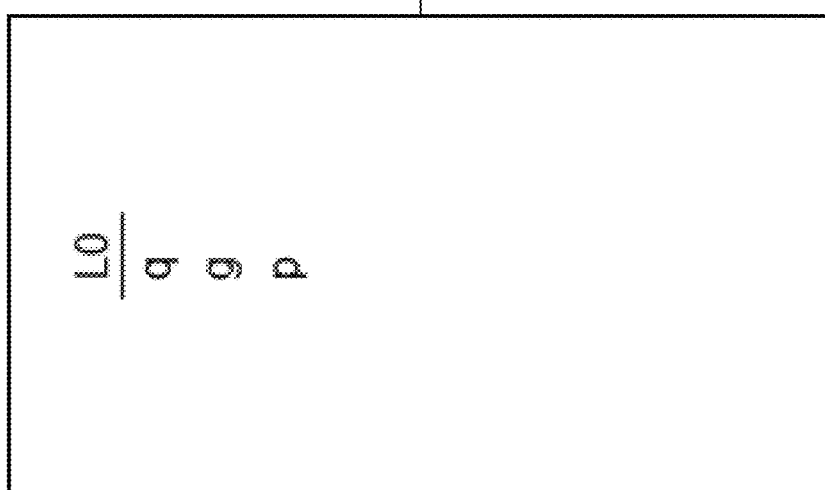
FIG. 13A depicts a list generated by performing homoglyph replacement in accordance with implementations of the disclosure.

At operation 730, a list is created that comprises one or more entries of allowable homoglyphs of the first set. For instance, following the previous example, a list comprising three entries—{q, g, p}—may be stored, as depicted by FIG. 13A.

At operation 740, a second set of one or more homoglyphs is created from the penultimate token part of the token. Referring again to the example of "yé57ïriq" and Table 2, the second-to-last character is i, which has associated homoglyphs {1, I, 1, ì, í, ï, e}. As such, the second set of homoglyphs in this example may include {i, I, 1, ì, í, ï e}.

At operation 750 the allowable character filter 124 is applied to the second set of homoglyphs associated with the preceding character. For example, applying an allowable character filter 124 to {i, I, 1, ì, í, ï, e} yields {i,1, e}.

In some implementations, to account for possible two-glyph homoglyphs in the token, the penultimate token part and the token part preceding the penultimate token part may be considered in determining the second set of homoglyphs. In the example of "yé57ïriq", "ri" has the associated homoglyph "n". As such, the second set of homoglyphs may also include "n," e.g., the second set may include {i, 1, e, n}.

At operation 760, each of the homoglyphs of the second set is prepended to at least one of the list's entries to update the list's entries. In some implementations, each of the homoglyphs of the second set are prepended to all of the list's entries. For example, taking the example with the token "yé57ïriq", the list's entries may be updated to include twelve elements: [iq, lq, eq, nq, ig, lg, eg, ng, ip, lp, ep, np]. In some implementations of method 700, a homoglyph of the second set is not prepended to an entry of the list if that entry was created in a previous step by prepending a homoglyph of a two-character glyph. For instance, consider the list entries nq, ng, np. During subsequent iterations in operations 830-840 involving character "r", the character "r" may not be prepended to entries nq, ng, and np because "ri" was used to generate the homoglyph "n".

At operation 770, after updating the list's entries, the bigram filter 112 is applied to the list to remove any of the entries of the list ending in bigram characters not present in words of the corpus. The mapping 113 between the bigram set and the corpus 111, may also or alternatively be applied to the list to remove any of the entries of the list ending in bigram characters not present in words of the corpus. Applying the bigram filter 112 and/or mapping 113 to the foregoing example, the entries "lq" and "nq" may be removed from the list because there are no words in the corpus ending with these entries.

If there are one or more additional token parts (decision 780), i.e., if the token has more than two parts, method 700 proceeds to operation 810 in FIG. 8. Otherwise, if there are no additional token parts (decision 780), method 700 proceeds to operation 860 in FIG. 8 to apply the probability filter 119 to identify as the best word the word in the list with the highest probability of occurrence in the corpus 111. At operation 870 method 700 proceeds to replace the token with the best word in the list. If the list only has one remaining entry, then that entry may be automatically selected as the best word.

Referring to FIG. 8, at operation 810 of method 700, a next set of one or more homoglyphs is determined for each previous token part. The next set of one or more homoglyphs may comprise the previous token and its associated homoglyphs. For example, after performing decision 780, the previous token part may be the antepenultimate token part, and one or more homoglyphs may be determined for the antepenultimate token part. At operation 820, the allowable character filter 124 is applied to the next set of one or more homoglyphs. At operation 830, each of the homoglyphs of the next set is prepended to at least one of the list's entries to update the list's entries. At operation 840, after updating the list's entries, the mapping 113 between the bigram set and the corpus 111 is applied to the list to remove any of the entries of the list ending in characters not present in words of the corpus.

When performing character replacement in tokens to find real words, the computational advantages of operation 840 may be especially noticeable for longer words as the length of each the entries in the list grows. Longer tokens will typically have fewer possible real words than shorter tokens. As more and more letters are added in the word, the number of possible combinations is reduced. This restrictive property may significantly improve performance of the algorithm in contrast to the naïve approach of storing all possibilities, which may be slower and significantly more memory intensive.

If there are additional token parts (decision 850), operations 810-840 may iterate for the remaining token parts. When there are no additional token parts (decision 850), method 700 proceeds at operation 860 to apply the probability filter 119 to identify as the best word the word in the list with the highest probability of occurrence in the corpus 111. If the list only has one remaining entry, then that entry may be automatically selected as the best word. At operation 870 method 700 proceeds to replace the token with the best word in the list.

The bigram filter 112 and mapping 113 may be in the form of a lookup table that provides a link between each of the bigrams and the corpus words that end with the bigram. By separating the corpus into different groups of words according to their unique last two characters, the search for the best word in the corpus to replace the token may be significantly sped up by eliminating a substantial number of words in the corpus.

The above-described example applying method 700 to "yé57ïriq" results in a list having two entries: "jesting" and "vesting." A word for the token is chosen from the viable candidates {jesting vesting} based on the probabilities of the candidates' occurrence in the corpus. In this example, a corpus with 5,800,115 unique words was created. The word "jesting" appeared 0 times in the corpus and the word "vesting" appeared 43 times in the corpus, giving probabilities of:

$$P(\text{jesting}) = \frac{0}{5800115} = 0;$$

and $$P(\text{vesting}) = \frac{43}{5800115} = 7.413646 * 10^{-6}.$$

In some implementations, the list may have only one remaining entry, in which case that entry is chosen as the best candidate word. In some implementations, a confidence level C of the selected best candidate word may be returned. This confidence may be determined as the ratio of the probability of the top ranked element over the Euclidean length of all probabilities. This may be mathematically expressed as $$C = \frac{P_{best}}{\|P\|}.$$

As such, in this example the word "vesting" was chosen. In this example, using the formulation that the level of confidence C is the ratio of the probability of the top ranked word over the Euclidean length of all probabilities, arrives at a confidence C=1.

Particular implementations for iterating through all of the characters of the token "yé57iriq" are further described below with reference to FIGS. 13A-13I.

In implementations of the disclosure, the bigram filter 112 is implemented with a bigram filter function $f$, the bigram to corpus mapping 113 is implemented with a dictionary check filter function g, and the allowable character filter function may be expressed as a. Recursive or iterative application of these functions in accordance with implementations of the disclosure may be mathematically expressed as $\Psi_{g_1, \ldots, l\text{-}2}(\Psi_f(I(C_a\{c: H\})))$ where $C_a\{c: H\}$ represents the set formed by applying the allowable character filter function a to the set formed by the last character c in the token and all its homoglyphs H, an operation that can be performed for every token part in the original token, and where I is the insertion function that prepends the characters filtered by the allowable character filter function a to the tokens of the previous step. For each token part, $len(C_a\{c: H\})-1$ additional glyphs may be created.

In this example, the bigram filter 112 comprises the unique set of bigram characters occurring at the end of words of length two or greater in the corpus 111. The bigram filter function $f$ may be applied to the last and/or first two token parts to determine if that pair occurs in any word(s) of the corpus 111, in which case that pair is a valid pair. If valid, the bigram filter function $f$ (i.e., the bigram filter 112) returns True, otherwise it returns False. For efficiency, the filter 112 may be created once and stored in binary form. The bigram to corpus mapping 113 may be defined by the dictionary check filter g function extracting the unique set of bigram characters from the end of all words in the corpus of length two or greater and creating groups of words ending with the same bigram.

$\Psi_f$ is the partial recursion function based on bigram filter function $f$ applied after the second token part is prepended, and $\Psi_{g_1, \ldots, l\text{-}2}$ is the partial recursion function based on dictionary check filter function g applied on all subsequent partial tokens which are of length 2 or longer (typically recursions 2 through l-2) where l is the length of the original token.

Implementations of the disclosure comprise one-time and/or iterative application of at least one of an allowable character filter 124, bigram filter 112, and bigram to corpus mapping 113 to identify at least one word in a corpus that is the token. Where more than one word is identified following application of the one or more filters, implementations of the disclosure utilize a probability filter 119 to select among the potential words the word in the corpus having the highest probability of being the word that is the token.

Figure 9:
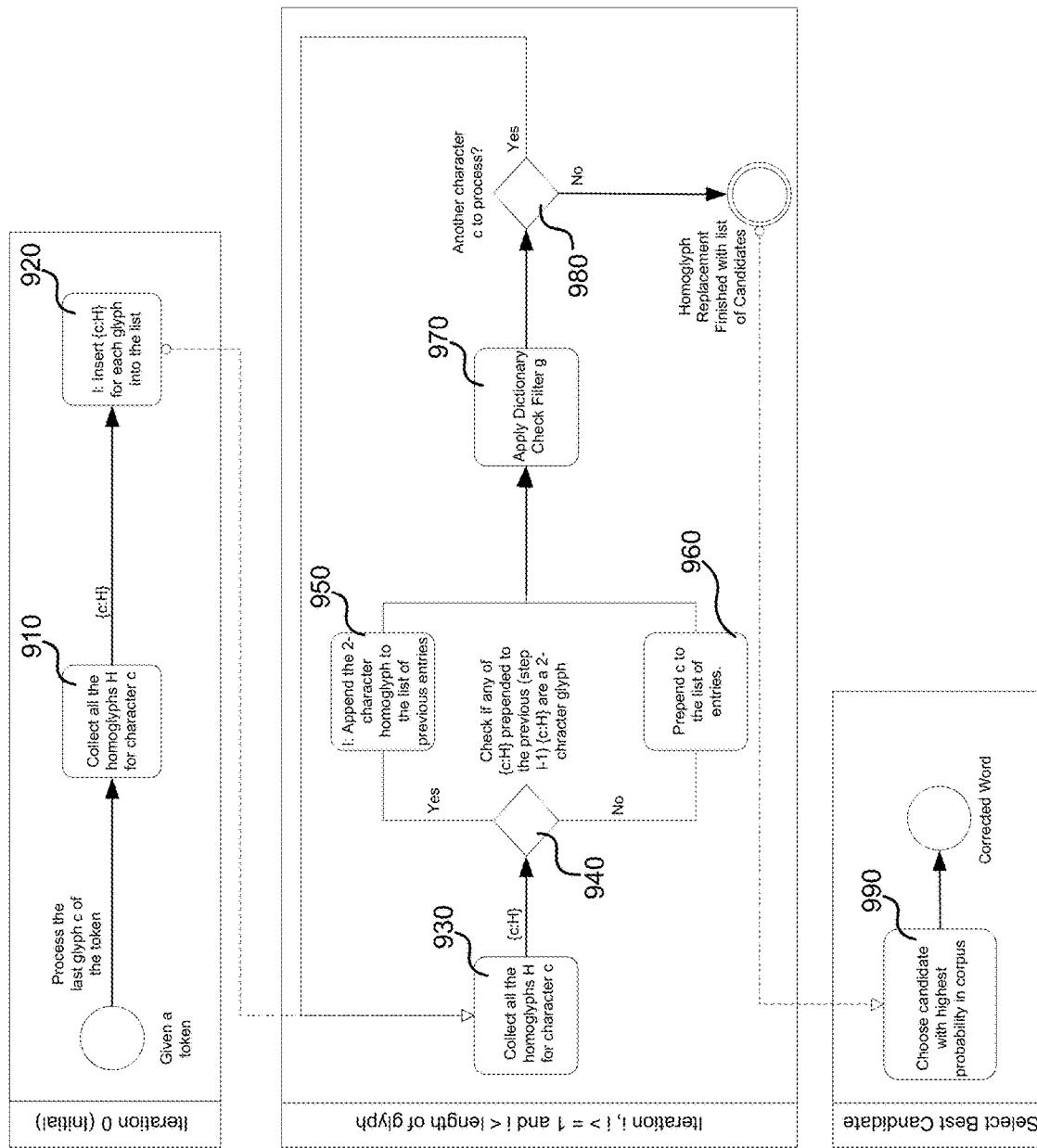
FIG. 9 is a flow diagram illustrating a method implementing homoglyph replacement to determine a best candidate word to replace a token, in accordance with implementations of the disclosure that utilize a bigram to corpus mapping.

FIG. 9 is a flow diagram illustrating a method 900 in accordance with implementations of the disclosure that utilize bigram to corpus mapping 113 to determine a best candidate word to replace a token. In this example, homoglyph replacement starts with the last token part and iterates through all token parts to the first token part. Method 900 is depicted with reference to the mathematical formulation described above. In the example of method 900, the bigram filter 112 and the allowable character filter 124 are not utilized.

As depicted in this example, for the initial iteration 0 (last token part), all homoglyphs associated with the token part are collected (operation 910), and the collected homoglyphs are inserted into a list (operation 920). For each subsequent iteration, the following operations are performed for the remaining token parts, in sequential order: all homoglyphs associated with the token part are collected (operation 930); a determination is made as to whether any homoglyphs prepended during the previous step are a 2-character glyph (operation 940); for the homoglyphs that are 2-character glyphs, the two character homoglyph is appended to the list of previous entries (operation 950); for the homoglyphs that are not 2-character glyphs, the homoglyph is prepended to the list of entries (operation 960); the mapping 113 is applied to remove entries in the list ending in bigrams that do not correspond to words in the corpus (operation 970); and a determination is made whether additional iterations are needed to process additional token parts (operation 980). Following generation of the list, the word with the highest probability is chosen (operation 990) by applying probability filter 119 to the list of possible words.

Figure 10:
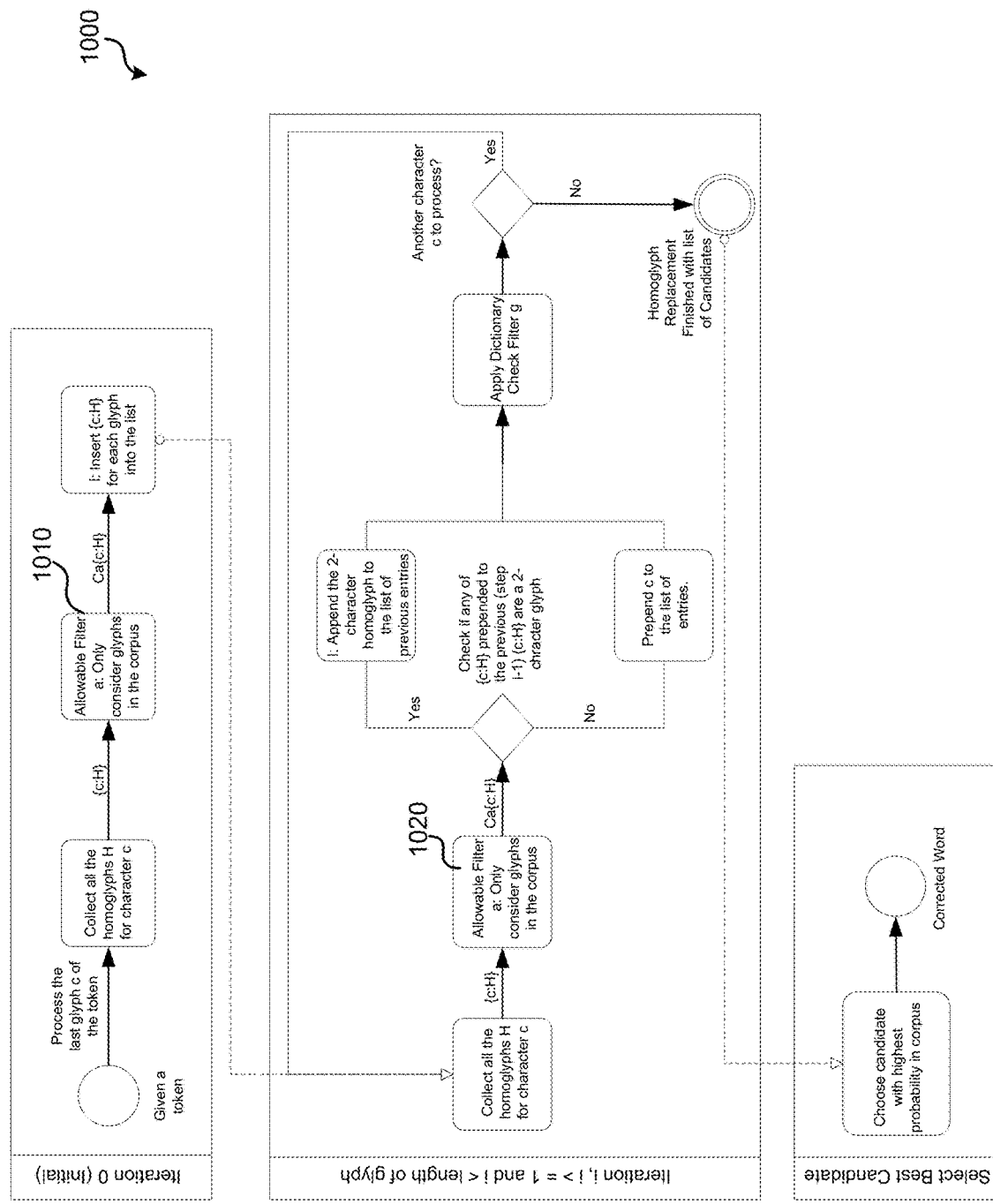
FIG. 10 is a flow diagram illustrating a method implementing homoglyph replacement to determine a best candidate word to replace a token, in accordance with implementations of the disclosure that utilize an allowable character filter and a bigram to corpus mapping.

FIG. 10 is a flow diagram illustrating a method 1000 implementing homoglyph replacement to determine a best candidate word to replace a token, in accordance with implementations of the disclosure that utilize an allowable character filter 124 and a bigram to corpus mapping 113. Method 1000 is depicted with reference to the mathematical formulation described above. As illustrated, method 1000 performs all the operations of method 900. In addition, method 1000 utilizes the allowable character filter 124 at operations 1010 and 1020, after homoglyphs for a given token part are collected, to filter out homoglyphs that are not allowed in the token (e.g., numbers, capitalized letters in the middle of a word, diacritics, etc.).

Figure 11:
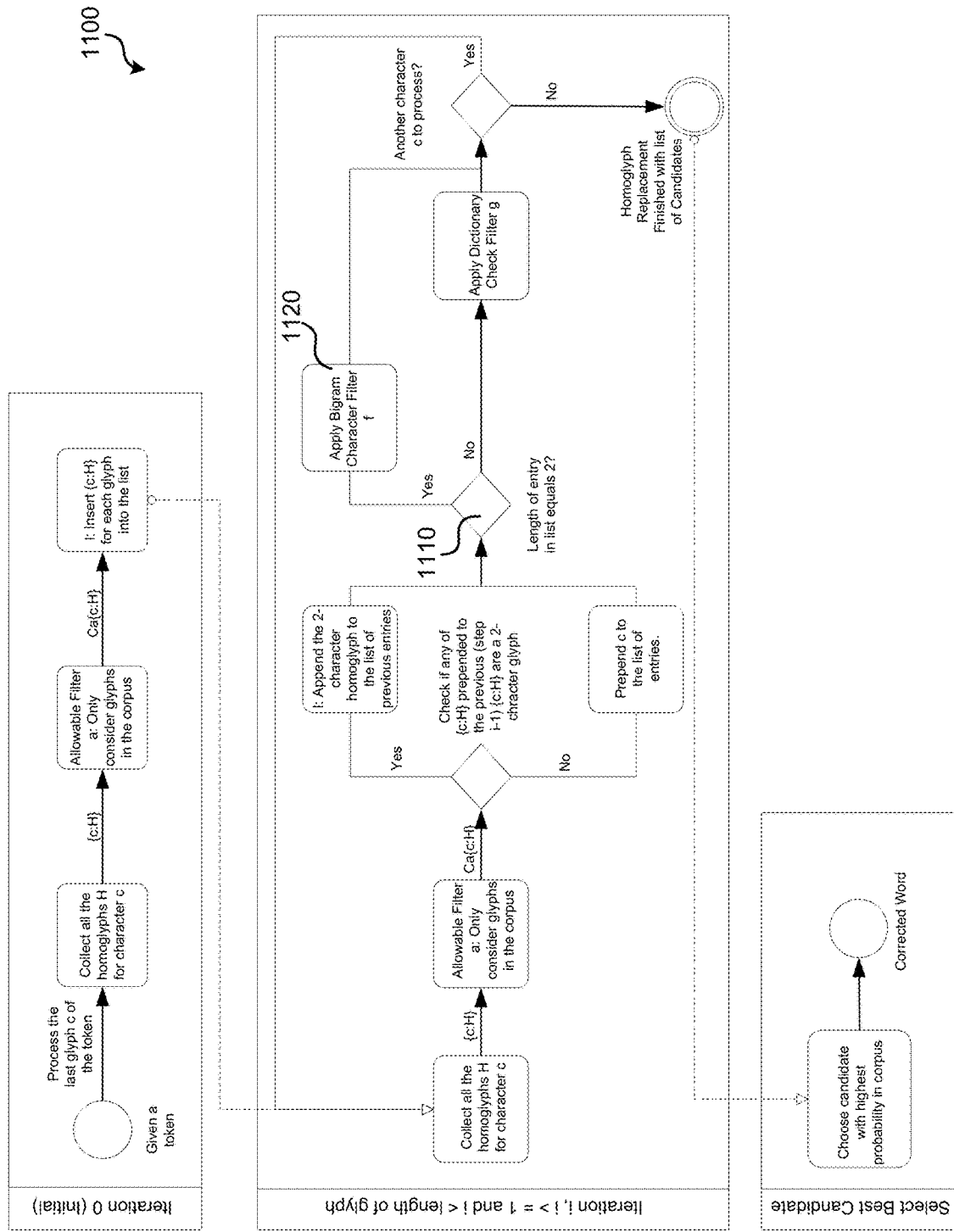
FIG. 11 is a flow diagram illustrating a method implementing homoglyph replacement to determine a best candidate word to replace a token, in accordance with implementations of the disclosure that utilize an allowable filter, a bigram to corpus mapping, and a bigram filter.

FIG. 11 is a flow diagram illustrating a method 1100 implementing homoglyph replacement to determine a best candidate word to replace a token, in accordance with implementations of the disclosure that utilize an allowable filter 124, a bigram to corpus mapping 113 and a bigram filter 112. Method 1100 is depicted with reference to the mathematical formulation described above. As illustrated, method 1100 performs all the operations of method 1100. In addition, method 1100 applies the bigram filter 112 at operation 1120 for entries in the list having a length equal to two (as determined at operation 1110).

Simulation Results

Figure 12:
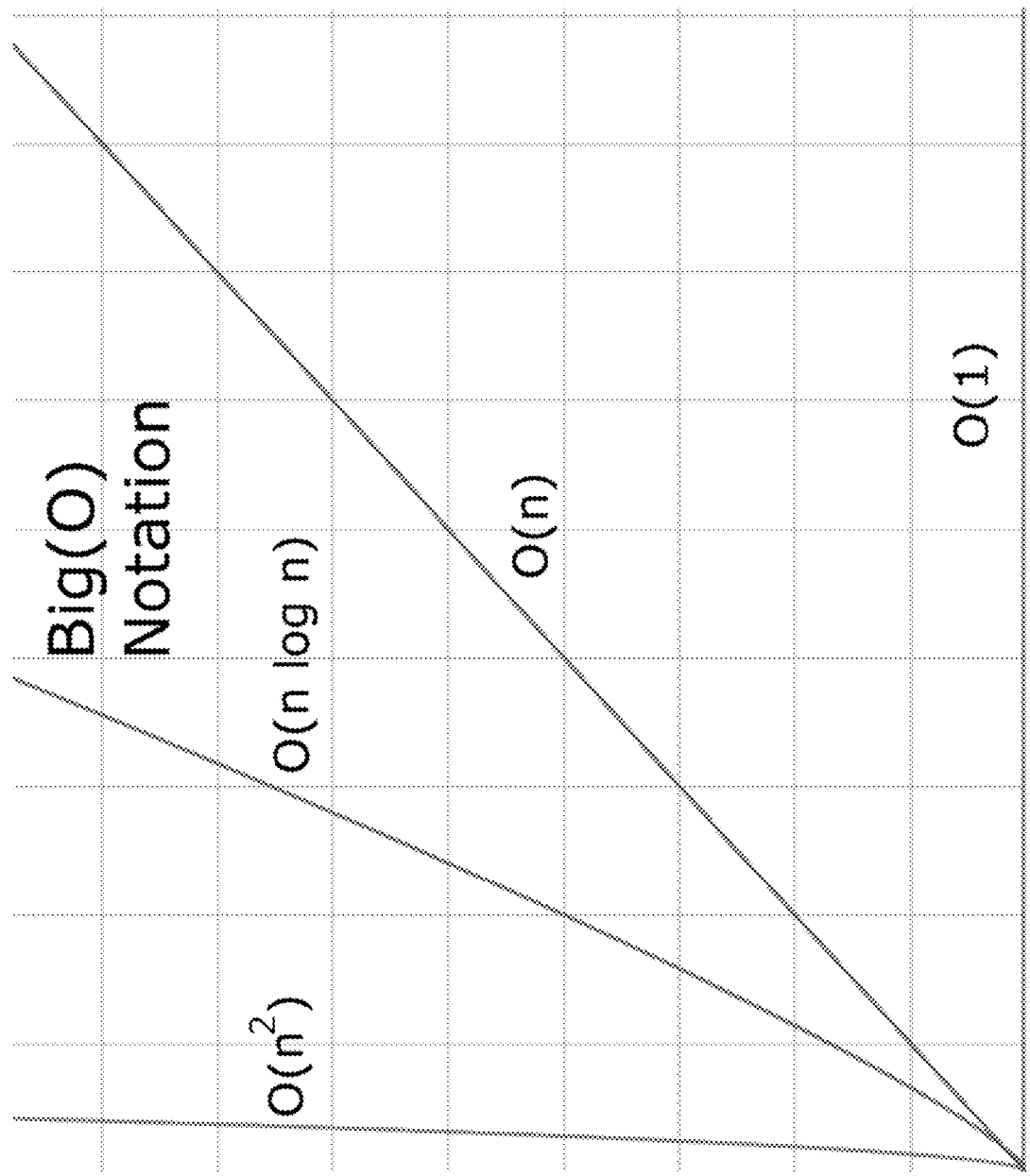
FIG. 12 depicts the cost of an algorithm for different Big-O complexities.

To illustrate the advantages of implementing the error correction and homoglyph replacement techniques described herein, it is instructive to compare implementations of this disclosure to other error correction and homoglyph replacement techniques. One way to evaluate performance of an execution algorithm is by determining the cost in terms of Big-O notation, where Big-O refers to a theoretical measure of the execution of an algorithm, usually the computing time or memory needed, given the problem size n, which is usually the number of items. Big-O is useful for illustrating how run-time and memory requirements of an algorithm increase together with the size of the input to the algorithm. FIG. 12 depicts the cost of an algorithm for different Big-O complexities.

By way of example, consider the application of homoglyph replacement techniques to the token "yé57ïriq". First, consider a simple replacement algorithm that replaces all characters in a word, each set of n replacement characters per character generating n new tokens, and after all combinations have been generated, checks against the appropriate corpus to select the most likely word. An exhaustive search over all tokens is expensive, both from a memory and time perspective. In the case of yé57ïriq, the token is 8 characters long and there are 33,600 total potential tokens (7*2*3*5*2*2*8*5) (the product of the number of possible homoglyphs for each character/glyph). In a Unicode string, it requires up to four bytes per character to store the character. For eight characters then, each token requires 32 bytes of storage. For 33,600 tokens, 8.6 megabytes are required to store all the possibilities. Generating 33,600 tokens when proceeding to do the replacements from front to back will require at least 33,600 string concatenations. Requiring such a large amount of memory space for storing tokens many be an inefficient use of memory resources. Additionally, because string objects are immutable in some software language implementations, from a runtime cost perspective it may be inefficient to concatenate many strings together as each concatenation creates a new object. For example, in Python, which implements strings as immutable, the process of storing and performing the many concatenations required a total of 614 megabytes of memory at runtime. The total runtime cost of concatenation may be quadratic $O(n^2)$ in the total string length. Accordingly, it may be desirable to reduce the amount of memory space and string concatenations ($O(n^2)$ operations) utilized.

Now consider application of a homoglyph replacement algorithm to the token "yé57ïriq" in accordance with FIG. 11. To evaluate each iteration and the recursive functions of the algorithm, it is instructive to note that the cost of insertion $I(C_a\{c: H\})$ is $O(n^2)$ is dominated by the cost of prepending of the character to the strings. This cost for the recursive application of bigram filter 112 (function ƒ), expressed as $\Psi_f$, is $O(1)$. The cost for the recursive application of bigram to corpus mapping 113 (function g), expressed as $\Psi_g$, is $O(n^2)$. As such, the performance cost of implementations of the disclosure the algorithm may be dominated by applying filter $\Psi_g$ and string concatenation in the algorithm. As further illustrated below, the size n may be dramatically reduced throughout the recursion process, especially by the iterative application of bigram to corpus mapping 113 (function g). This reduction may depend on the occurrence of n-gram character sequences in the corpus. However, it is notable that as the n-gram character fragment grows, the number of word possibilities shrinks.

As shown by FIG. 13A, a $0^{th}$ iteration of the list, referred to as L0, is created that is seeded with C{c: H}—the last token part (q) and all its homoglyphs, i.e., {q, g, p} after application of the allow able character filter 124. The performance summary of this iteration of the algorithm (L0) is given by 3 $O(n^2)$ operations for the string creation with 3 elements stored as the list.

Figure 13B:
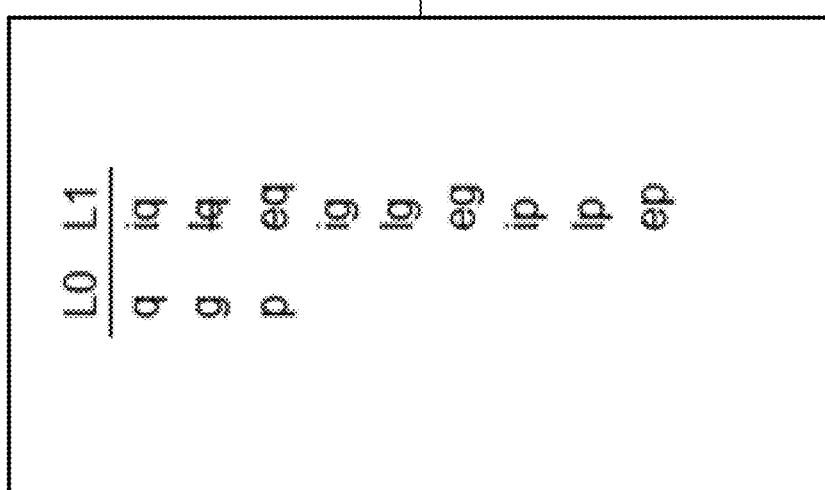
FIG. 13B depicts a list generated by performing homoglyph replacement in accordance with implementations of the disclosure.

Consider iteration L1 for the penultimate token part i in yé57ïriq. After this iteration the bigram filter 112 is not used. The set of all possible homoglyph characters {c: H} is given {i 1 I l ì í ï e}. After applying the allowable character filter 124, the remaining set of homoglyph characters given by $C_a(\{c: H\})$ is {i, l, e}. Each of the characters of this set is prepended to the tokens in L0 to form a first set of bigram character sequences held in L1, as depicted by the second column in FIG. 13B. Thereafter, the bigram filter $\Psi_f$ 112 is applied to check the bigram character entries in L1 to filter out the bigram characters lq, as shown in FIG. 13B. The performance summary of this iteration (L1) of the algorithm is given by: 1 $O(1)$ operation for the allowable character filter 124; 9 $O(n^2)$ operations for the string concatenation; 9 $O(1)$ operations for the bigram filter 112; and 8 elements stored as the list (1 removed).

Figure 13C:
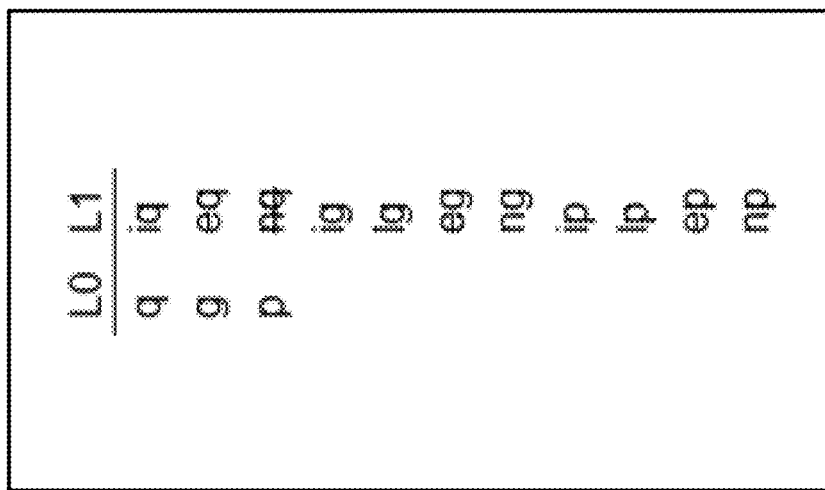
FIG. 13C depicts a list generated by performing homoglyph replacement in accordance with implementations of the disclosure.

As noted above, it may also be necessary to check for any two-glyph homoglyphs. In this instance, ri is a homoglyph of n, and n is added to the list (but not ri, as the algorithm appends single glyphs per recursion). As depicted by FIG. 13C, this adds three new entries {nq, ng, np} to the list L1. Applying the bigram filter $\Psi_f$ 112 on the three entries {nq, ng, np} filters out bigram nq in this example since there are no words in the example corpus ending with nq. The performance summary of this iteration (L1) of the algorithm is given by: 1 $O(1)$ operation for the allowable character filter 124; 3 $O(n^2)$ operations for the string concatenation; 11 $O(1)$ operations for the bigram filter 112; and 10 elements stored as the list (1 removed).

Thereafter, the following set of operations may be performed for the remaining token parts. Consider iteration L2 for the token part r in yé57ïriq, and its homoglyphs, which are {r, n}. In this instance, r is not prepended to ng or to np as r was used as part of the two-letter homoglyph ri. FIG. 13D depicts the list L2 after the homoglyphs are prepended to the list of L1. Applying the bigram to corpus mapping $\Psi_g$ 113, it may be determined whether the new three letter tokens exist in any of the dictionary entries. In this example, the following entries are eliminated: {riq, niq, neq, rlp, nlp}. Additionally, ïr in yé57ïriq is checked to determine if it is a two-letter homoglyph—it is not. The performance summary of this iteration (L2) of the algorithm is given by: 1 $O(1)$ operation for the allowable character filter 124; 18 $O(n^2)$ operations for the string concatenation; 18 $O(n^2)$ operations for bigram to corpus mapping 113; and 11 elements stored as the list (7 removed).

Consider iteration L3 for the token part ï in yé57ïriq, and its homoglyphs, which are {ï, i}. The allowable character filter 124 eliminates ï since because is a diacritic. Prepending i to the remaining L2 entries results in list L3, depicted by FIG. 13E. Applying the bigram to corpus mapping filter $\Psi_g$ 113 eliminates the following from L3: {ireq, irig, inig, ireg, ineg, irip, irep, inep, inp}. Additionally, 7ï in yé57ïriq is checked to determine if it is a two-letter homoglyph—it is not. As illustrated by FIG. 13E, the advantage of the constraining power of the bigram to corpus mapping $\Psi_g$ 113 comes into play as the length of the token fragment increases. Significantly, the number of possible tokens decreases as the length of the token fragment increases. This occurs because the longer the n-gram character, the less likely it is to occur. This is one of the reasons why the homoglyph replacement methods described herein may be efficient from both a memory and a performance perspective. The performance summary of this iteration (L3) of the algorithm is given by: 1 $O(1)$ operation for the allowable character filter 124; 11 $O(n^2)$ operations for the string concatenation; 11 $O(n^2)$ operations for the bigram to corpus mapping 113; and 2 elements stored as the list (9 removed).

Consider iteration L4 for the token part 7 in yé57ïriq and its homoglyphs {T I q}. Applying the allowable character filter 124 removes 7 (a number) and T and I (wrong case). Prepending each of {t,q} to the remaining L3 entries results in L4, as depicted by FIG. 13F. Applying the bigram to corpus mapping $\Psi_g$ 113 eliminates {tinip, qinip}. Additionally, 57 in yé57ïriq is checked to determine if it is a two-letter homoglyph—it is not. The performance summary of this iteration (L4) of the algorithm is given by: 1 O(1) operation for the allowable character filter 124; 4 O($n^2$) operations for the string concatenation; 4 O($n^2$) operations for the bigram to corpus mapping 113; and 2 elements stored as the list (2 removed).

Consider iteration L5 for the token part 5 in yé57ïriq and its homoglyphs {s S}. After applying the allowable character filter 124, only s is prepended to the entries in L4 to form L5, as depicted by FIG. 13G. Applying the bigram to corpus mapping $\Psi_g$ 113 eliminates {sging}. Additionally, é5 in yé57ïriq is checked to determine if it is a two-letter homoglyph—it is not. The performance summary of this iteration (L5) of the algorithm is given by: 1 O(1) operation for the allowable character filter 124; 2 O($n^2$) operations for the string concatenation; 2 O($n^2$) operations for the bigram to corpus mapping 113; and 1 elements stored as the list (1 removed).

Consider iteration L6 for the token part é in yé57ïriq and its homoglyph {e}. After applying the allowable character filter 124, only e is prepended to the entries in L5 to form L6, as depicted by FIG. 13H. Applying the bigram to corpus mapping $\Psi_g$ 113 in this example does not eliminate any entries in L6. Additionally, yé in yé57ïriq is checked to determine if it is a two-letter homoglyph—it is not. The performance summary of this iteration (L6) of the algorithm is given by: 1 O (1) operation for the allowable character filter 124; 1 O ($n^2$) operations for the string concatenation; 1 O($n^2$) operations for the bigram to corpus mapping 113; and 1 element stored as the list (0 removed).

Consider iteration L7 for the token part y in yé57ïriq and its homoglyphs {j p v u x}. After applying the allowable character filter 124, all letters but J are prepended to the entries left in L6 to form L7, as depicted by FIG. 13I. As depicted in FIG. 13I, the six entries in L7 are the final candidate words. Applying the bigram to corpus mapping $\Psi_g$ 113 the viable candidates may be {jesting vesting}. The performance summary of this iteration (L7) of the algorithm is given by: 1 O(1) operation for the allowable character filter 124; 6 O($n^2$) operations for the string concatenation; 6 O($n^2$) operations for the bigram to corpus mapping 113; and 2 elements stored as the list (4 removed).

As discussed above, application of the probability filter 119 results in a final candidate being chosen from the viable candidates {jesting vesting} based on the probabilities of the candidates in the corpus 111. In this example, a corpus with 5,800,115 unique words was created. The word "jesting" appeared 0 times in the corpus and the word "vesting" appeared 43 times in the corpus, giving probabilities of:

$$P(\text{jesting}) = \frac{0}{5800115} = 0;$$

and $$P(\text{vesting}) = \frac{43}{5800115} = 7.413646 * 10^{-6}.$$

As such, in this example the word "vesting" was chosen. In this example, using the formulation that the level of confidence C is the ratio of the probability of the top ranked element over the Euclidean length of all probabilities, arrives at a confidence C=1.

To determine the big-O performance and memory used by the foregoing example to correct yé57ïriq, consider that 109 O($n^2$) operations, 56 string concatenations, and 53 bigram to corpus mapping 113 were used. Additionally, the maximum size of the list of token fragments/tokens at any step was 18, and the total number of new elements created through string concatenations was 56. By implementing the foregoing example, the number of O($n^2$) operations were reduced from 19,201 to 109. Additionally, the number of allocated words was reduced from 33,600 down to 56. Initial performance showed that wall clock speed (calculated programmatically in the software during operation) of the algorithm improved three orders of magnitude.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer-readable storage medium storing instructions that, when executed by a processor, cause a system to perform operations comprising:
   obtaining optical character recognition (OCR) text extracted from a document image, the OCR text comprising a token;
   searching a corpus for a best word to replace the token by performing operations comprising:
      determining one or more homoglyph pairs of each of a first token part and a second token part of the token, or each of a last token part and a penultimate token part of the token;
      determining a token bigram as one of the one or more homoglyph pairs; and
      using a mapping that groups words in the corpus based on unique bigrams from the beginning or ending of the words in the corpus; and
   replacing the token with the best word.

2. The non-transitory computer-readable storage medium of claim 1, wherein searching the corpus for the best word comprises searching only the words in the corpus beginning or ending with a bigram that is the same as the token bigram.

3. The non-transitory computer-readable storage medium of claim 1, wherein searching the corpus for the best word further comprises:
   creating, based on the token bigram and the mapping, a list comprising a plurality of possible words, the possible words including the best word;
   determining a probability of occurrence of each of the plurality of possible words in the corpus; and
   selecting as the best word the one of the plurality of possible words having the highest probability of occurrence in the corpus.

4. A non-transitory computer-readable storage medium storing instructions that, when executed by a processor, cause a system to perform operations comprising:
   obtaining optical character recognition (OCR) text extracted from a document image, the OCR text comprising a token;
   searching a corpus for a best word to replace the token by performing operations comprising:
      determining a first set of one or more homoglyphs from a first token part of the token or a last token part of the token;
      creating a first list of one or more homoglyphs from the first set;
      determining a second set of one or more homoglyphs from a second token part of the token or a penultimate token part of the token;
      appending or prepending each of the homoglyphs of the second set to at least one of the homoglyphs of the first list to create an updated first list; and
      using a mapping that groups words in the corpus based on unique bigrams from the beginning or ending of the words in the corpus; and
   replacing the token with the best word.

5. The non-transitory computer-readable storage medium of claim 4, wherein:
   determining the first set of homoglyphs, comprises: determining one or more first homoglyphs of the first token part or the last token part; and applying an allowable character filter to the first homoglyphs and the first token part or the last token part; and
   determining the second set of homoglyphs, comprises: determining one or more second homoglyphs of the second token part or the penultimate token part; and applying the allowable character filter to the second homoglyphs and the second token part or the penultimate token part.

6. The non-transitory computer-readable storage medium of claim 5, wherein the allowable character filter is configured to filter out predetermined characters.

7. The non-transitory computer-readable storage medium of claim 6, wherein the predetermined characters comprise diacritics, numerical characters, and capitalized characters.

8. The non-transitory computer-readable storage medium of claim 4, wherein using the mapping, comprises: removing, using the mapping, any of the entries of the updated first list beginning or ending with a bigram character sequence not present in the words of the corpus.

9. The non-transitory computer-readable storage medium of claim 8, wherein the token comprises more than two token parts, and wherein searching the corpus for the best word further comprises:
   determining a third set of one or more homoglyphs for a third token part of the token or an antepenultimate token part of the token;
   appending or prepending each of the homoglyphs of the third set to at least one of the entries of the updated first list to create a further updated first list of entries; and
   removing, using the mapping, any entries of the further updated first list beginning or ending with a character sequence not present in the words of the corpus.

10. The non-transitory computer-readable storage medium of claim 9, wherein determining the third set of homoglyphs, comprises determining one or more third homoglyphs of the third token part or the antepenultimate token part; and applying an allowable character filter to the third homoglyphs and the third token part or the antepenultimate token part, wherein the allowable character filter is configured to filter out predetermined characters.

11. The non-transitory computer-readable storage medium of claim 10, wherein the predetermined characters comprise diacritics, numerical characters, and capitalized characters.

12. A method, comprising:
   obtaining, at a computing device, optical character recognition (OCR) text extracted from a document image, the text comprising a token;
   searching, at the computing device, a corpus for a best word to replace the token by performing operations comprising:
      determining one or more homoglyph pairs of each of a first token part and a second token part of the token, or each of a last token part and a penultimate token part of the token;
      determining a token bigram as one of the one or more homoglyph pairs; and
      using a mapping that groups words in the corpus based on unique bigrams from the beginning or ending of the words in the corpus; and
   replacing, at the computing device, the token with the best word.

13. A method, comprising:
   obtaining, at a computing device, optical character recognition (OCR) text extracted from a document image, the OCR text comprising a token;
   searching, at the computing device, a corpus for a best word to replace the token by performing operations comprising:
      determining a first set of one or more homoglyphs from a first token part of the token or a last token part of the token;
      creating a first list of one or more homoglyphs from the first set;
      determining a second set of one or more homoglyphs from a second token part of the token or a penultimate token part of the token;
      appending or prepending each of the homoglyphs of the second set to at least one of the homoglyphs of the first list to create an updated first list; and
      using a mapping that groups words in the corpus based on unique bigrams from the beginning or ending of the words in the corpus; and
   replacing, at the computing device, the token with the best word.

14. The method of claim 13, wherein using the mapping, comprises; removing, using the mapping, any of the entries of the updated first list beginning or ending with a bigram character sequence not present in the words of the corpus.

15. The method of claim 14, wherein the token comprises more than two token parts, and wherein searching the corpus for the best word further comprises:
   determining a third set of one or more homoglyphs for a third token part of the token or an antepenultimate token part of the token;
   appending or prepending each of the homoglyphs of the third set to at least one of the entries of the updated first list to create a further updated first list of entries; and
   removing, using the mapping, any entries of the further updated first list beginning or ending with a character sequence not present in the words of the corpus.

16. A non-transitory computer-readable storage medium storing instructions that, when executed by a processor, cause a system to perform operations comprising:
   obtaining text from a document associated with an application, the text comprising a token;
   obtaining a token bigram from the token by performing operations comprising:
      determining one or more homoglyph pairs of each of a first token part and a second token part of the token, or each of a last token part and a penultimate token part of the token; and
      determining the token bigram as one of the one or more homoglyph pairs;
   obtaining a plurality of possible words for the token by applying a bigram to corpus mapping filter to determine if the token bigram is the same as a bigram at the beginning of or the end of at least one word of a corpus;
   applying a probability filter to identify a word in the corpus as a most probable word of the possible words for the token; and
   replacing the token with the most probable word.

17. The non-transitory computer-readable storage medium of claim 16, wherein obtaining the plurality of possible words, comprises: iteratively applying at least one filter to obtain the plurality of possible words, the at least one filter comprising: the bigram to corpus mapping filter, an allowable character filter, or a bigram filter.

* * * * *